US012598670B2

(12) United States Patent
Park et al.

(10) Patent No.: US 12,598,670 B2
(45) Date of Patent: Apr. 7, 2026

(54) METHOD AND APPARATUS FOR STOPPING SL DRX INACTIVITY TIMER IN NR V2X

(71) Applicant: LG Electronics Inc., Seoul (KR)

(72) Inventors: Giwon Park, Seoul (KR); Seungmin Lee, Seoul (KR); Jongwoo Hong, Seoul (KR); Seoyoung Back, Seoul (KR)

(73) Assignee: LG Electronics Inc., Seoul (KR)

( * ) Notice: Subject to any disclaimer, the term of this patent is extended or adjusted under 35 U.S.C. 154(b) by 323 days.

(21) Appl. No.: 18/290,116

(22) PCT Filed: May 11, 2022

(86) PCT No.: PCT/KR2022/006708
§ 371 (c)(1),
(2) Date: Nov. 9, 2023

(87) PCT Pub. No.: WO2022/240167
PCT Pub. Date: Nov. 17, 2022

(65) Prior Publication Data
US 2024/0260126 A1    Aug. 1, 2024

Related U.S. Application Data

(60) Provisional application No. 63/187,895, filed on May 12, 2021, provisional application No. 63/187,383, filed on May 11, 2021.

(51) Int. Cl.
*H04W 76/28*    (2018.01)
*H04W 72/25*    (2023.01)
*H04W 76/38*    (2018.01)
*H04W 92/18*    (2009.01)

(52) U.S. Cl.
CPC .......... *H04W 76/28* (2018.02); *H04W 72/25* (2023.01); *H04W 76/38* (2018.02); *H04W 92/18* (2013.01)

(58) Field of Classification Search
CPC ....... H04W 4/40; H04W 72/25; H04W 72/40; H04W 76/14; H04W 76/28; H04W 76/38; H04W 92/18; Y02D 30/70
See application file for complete search history.

(56) References Cited

U.S. PATENT DOCUMENTS

| | | | | |
|---|---|---|---|---|
| 11,055,332 B1* | 7/2021 | Cierniak | ............... | G06F 16/338 |
| 2018/0035477 A1* | 2/2018 | Van Phan | ............. | H04L 67/146 |
| 2020/0084783 A1* | 3/2020 | Li | ........................... | H04L 5/0033 |
| 2020/0236656 A1* | 7/2020 | Cao | ........................ | H04W 72/23 |
| 2020/0314959 A1* | 10/2020 | Agiwal | ................ | H04W 92/18 |
| 2021/0105760 A1* | 4/2021 | Chen | ................ | H04W 72/0446 |
| 2021/0303570 A1* | 9/2021 | Kondiles | ........... | G06F 16/24542 |

(Continued)

*Primary Examiner* — Dung B Huynh
(74) *Attorney, Agent, or Firm* — Fish & Richardson P.C.

(57) ABSTRACT

Proposed is a method for operation of a first device (100) in a wireless communication system. The method may comprise the steps of: performing first L1 ID matching related to a second device (200); initiating an inactivity timer on the basis of a success in the first L1 ID matching; performing second L1 ID matching related to a third device (300); re-initiating the inactivity timer on the basis of a success in the second L1 ID matching; and stopping the inactivity timer on the basis of a failure of first L2 ID matching related to the second device (200) and second L2 ID matching related to the third device (300).

15 Claims, 19 Drawing Sheets

(56)     References Cited

U.S. PATENT DOCUMENTS

| | | | |
|---|---|---|---|
| 2022/0015186 A1* | 1/2022 | Jeong ................... | H04L 1/1896 |
| 2022/0053496 A1* | 2/2022 | Yu ......................... | H04L 5/0053 |
| 2022/0191965 A1* | 6/2022 | Agiwal ................ | H04L 1/0025 |
| 2022/0353945 A1* | 11/2022 | Liu ....................... | H04W 76/28 |
| 2023/0319951 A1* | 10/2023 | Cai ...................... | H04W 72/25 |
| | | | 370/252 |
| 2023/0362973 A1* | 11/2023 | Huang ................ | H04W 72/542 |
| 2024/0121858 A1* | 4/2024 | Park ..................... | H04W 76/28 |
| 2024/0163962 A1* | 5/2024 | Freda ................... | H04W 76/23 |
| 2024/0172027 A1* | 5/2024 | Liu ....................... | H04W 24/10 |
| 2025/0185061 A1* | 6/2025 | Lin ....................... | H04W 16/14 |
| 2025/0294585 A1* | 9/2025 | Blasco Serrano .... | H04W 72/25 |
| 2025/0324452 A1* | 10/2025 | Hong ................... | H04W 72/02 |
| 2025/0344285 A1* | 11/2025 | Li ......................... | H04L 1/1812 |

* cited by examiner (a)                              (b)

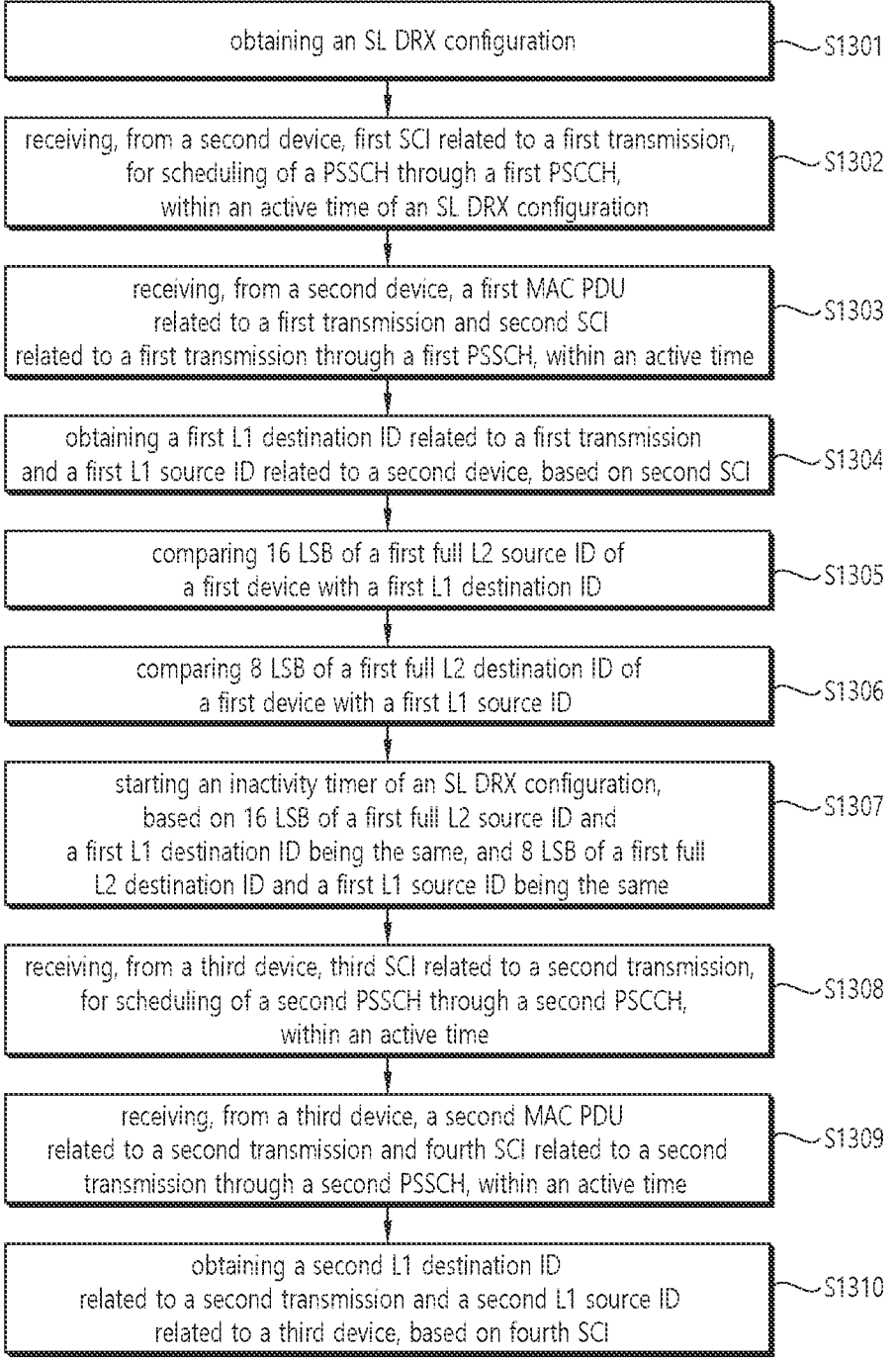

obtaining an SL DRX configuration ——S1301 receiving, from a second device, first SCI related to a first transmission, for scheduling of a PSSCH through a first PSCCH, within an active time of an SL DRX configuration ——S1302 receiving, from a second device, a first MAC PDU related to a first transmission and second SCI related to a first transmission through a first PSSCH, within an active time ——S1303 obtaining a first L1 destination ID related to a first transmission and a first L1 source ID related to a second device, based on second SCI ——S1304 comparing 16 LSB of a first full L2 source ID of a first device with a first L1 destination ID ——S1305 comparing 8 LSB of a first full L2 destination ID of a first device with a first L1 source ID ——S1306 starting an inactivity timer of an SL DRX configuration, based on 16 LSB of a first full L2 source ID and a first L1 destination ID being the same, and 8 LSB of a first full L2 destination ID and a first L1 source ID being the same ——S1307 receiving, from a third device, third SCI related to a second transmission, for scheduling of a second PSSCH through a second PSCCH, within an active time ——S1308 receiving, from a third device, a second MAC PDU related to a second transmission and fourth SCI related to a second transmission through a second PSSCH, within an active time ——S1309 obtaining a second L1 destination ID related to a second transmission and a second L1 source ID related to a third device, based on fourth SCI ——S1310 transmitting, to a first device,
first SCI and a first MAC PDU,
within an active time of an SL DRX configuration          ~S1410 transmitting, to a first device, second SCI
and a second MAC PDU, within an active time          ~S1420

FIG. 18

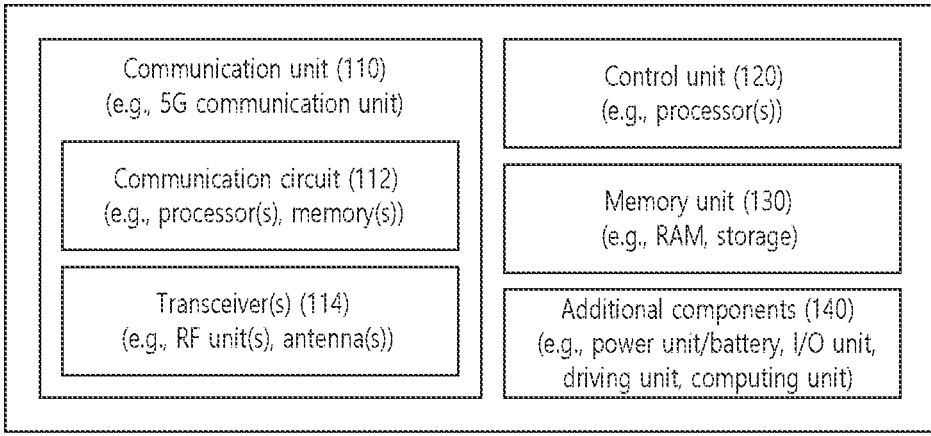

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 19

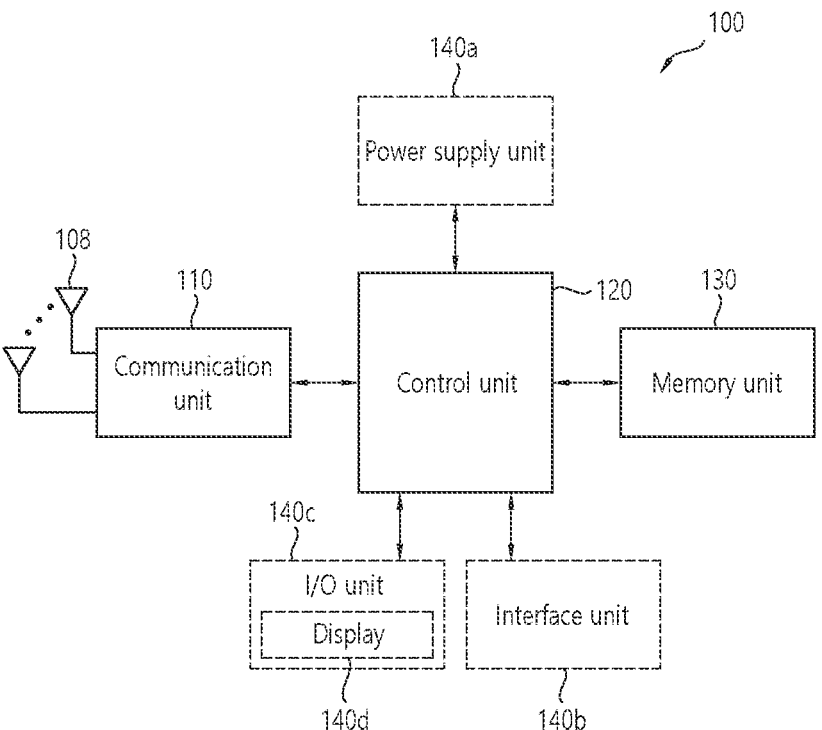

140a

Power supply unit

108

110

Communication unit

120

Control unit

130

Memory unit

140c

I/O unit

Display

140d

Interface unit

140b

100

METHOD AND APPARATUS FOR STOPPING SL DRX INACTIVITY TIMER IN NR V2X

CROSS-REFERENCE TO RELATED APPLICATIONS

This application is a National Stage application under 35 U.S.C. § 371 of International Application No. PCT/KR2022/006708, filed on May 11, 2022, which claims the benefit of U.S. Provisional Application No. 63/187,383, filed on May 11, 2021 and U.S. Provisional Application No. 63/187,895, filed on May 12, 2021. The disclosures of the prior applications are incorporated by reference in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication apparatuses require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

According to an embodiment of the present disclosure, a method for performing, by a first device, wireless communication may be proposed. For example, the method may comprise: obtaining a sidelink (SL) discontinuous reception (DRX) configuration; receiving, from a second device, first sidelink control information (SCI) related to a first transmission, for scheduling of a first physical sidelink shared channel (PSSCH) through a first physical sidelink control channel (PSCCH), within an active time of the SL DRX configuration; receiving, from the second device, a first medium access control (MAC) protocol data unit (PDU) related to the first transmission and second SCI related to the first transmission through the first PSSCH, within the active time; obtaining a first layer (L) 1 destination identifier (ID) related to the first transmission and a first L source ID related to the second device, based on the second SCI; comparing 16 least significant bits (LSB) of a first full L2 source ID of the first device with the first L1 destination ID; comparing 8 LSB of a first full L2 destination ID of the first device with the first L1 source ID; starting an inactivity timer of the SL DRX configuration, based on the 16 LSB of the first full L2 source ID and the first L1 destination ID being the same, and the 8 LSB of the first full L2 destination ID and the first L1 source ID being the same; receiving, from a third device, third SCI related to a second transmission, for scheduling of a second PSSCH through a second PSCCH, within the active time; receiving, from the third device, a second MAC PDU related to the second transmission and fourth SCI related to the second transmission through the second PSSCH, within the active time; obtaining a second L1 destination ID related to the second transmission and a second L1 source ID related to the third device, based on the fourth SCI; comparing the 16 LSB of the first full L2 source ID with the second L1 destination ID; comparing the 8 LSB of the first full L2 destination ID with the second L1 source ID; restarting the inactivity timer, based on the 16 LSB of the first full L2 source ID and the second L1 destination ID being the same, and the 8 LSB of the first full L2 destination ID and the second L1 source ID being the same; obtaining a first partial L2 destination ID related to the first transmission and a first partial L2 source ID related to the second device based on the first MAC PDU; obtaining a second full L2 destination ID related to the first transmission, based on the first L1 destination ID and the first partial L2 destination ID; obtaining a second full L2 source ID related to the second device, based on the first L1 source ID and the first partial L2 source ID; obtaining a second partial L2 destination ID related to the second transmission and a second partial L2 source ID related to the third device based on the second MAC PDU; obtaining a third full L2 destination ID related to the second transmission, based on the second L1 destination ID and the second partial L2 destination ID; obtaining a third full L2 source ID related to the third device, based on the second L1 source ID and the second partial L2 source ID; and stopping the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration; receive, from a second device, first sidelink control information (SCI) related to a first transmission, for scheduling of a first physical sidelink shared channel (PSSCH) through a first physical sidelink control channel (PSCCH), within an active time of the SL DRX configuration; receive, from the second device, a first medium access control (MAC) protocol data unit (PDU) related to the first transmission and second SCI related to the first transmission through the first PSSCH, within the active time; obtain a first layer (L) 1 destination identifier (ID) related to the first transmission and a first L1 source ID related to the second device, based on the second SCI; compare 16 least significant bits (LSB) of a first full L2 source ID of the first device with the first L1 destination ID; compare 8 LSB of a first full L2 destination ID of the first device with the first L1 source ID; start an inactivity timer of the SL DRX configuration, based on the 16 LSB of the first full L2 source ID and the first L1 destination ID being the same, and the 8 LSB of the first full L2 destination ID and the first L1 source ID being the same; receive, from a third device, third SCI related to a second transmission, for scheduling of a second PSSCH through a second PSCCH, within the active time; receive, from the third device, a second MAC PDU related to the second transmission and fourth SCI related to the second transmission through the second PSSCH, within the active time; obtain a second L1 destination ID related to the second transmission and a second L1 source ID related to the third device, based on the fourth SCI; obtain a second L1 destination ID related to the second transmission and a second L1 source ID related to the third device, based on the fourth SCI; compare the 16 LSB of the first full L2 source ID with the second L1 destination ID; compare the 8 LSB of the first full L2 destination ID with the second L1 source ID; restart the inactivity timer, based on the 16 LSB of the first full L2 source ID and the second L1 destination ID being the same, and the 8 LSB of the first full L2 destination ID and the second L1 source ID being the same; obtain a first partial L2 destination ID related to the first transmission and a first partial L2 source ID related to the second device based on the first MAC PDU; obtain a second full L2 destination ID related to the first transmission, based on the first L1 destination ID and the first partial L2 destination ID; obtain a second full L2 source ID related to the second device, based on the first L1 source ID and the first partial L2 source ID; obtain a second partial L2 destination ID related to the second transmission and a second partial L2 source ID related to the third device based on the second MAC PDU; obtain a third full L2 destination ID related to the second transmission, based on the second L1 destination ID and the second partial L2 destination ID; obtain a third full L2 source ID related to the third device, based on the second L1 source ID and the second partial L2 source ID; and stop the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain a sidelink (SL) discontinuous reception (DRX) configuration; receive, from a second UE, first sidelink control information (SCI) related to a first transmission, for scheduling of a first physical sidelink shared channel (PSSCH) through a first physical sidelink control channel (PSCCH), within an active time of the SL DRX configuration; receive, from the second UE, a first medium access control (MAC) protocol data unit (PDU) related to the first transmission and second SCI related to the first transmission through the first PSSCH, within the active time; obtain a first layer (L) 1 destination identifier (ID) related to the first transmission and a first L1 source ID related to the second UE, based on the second SCI; compare 16 least significant bits (LSB) of a first full L2 source ID of the first UE with the first L1 destination ID; compare 8 LSB of a first full L2 destination ID of the first UE with the first L1 source ID; start an inactivity timer of the SL DRX configuration, based on the 16 LSB of the first full L2 source ID and the first L1 destination ID being the same, and the 8 LSB of the first full L2 destination ID and the first L1 source ID being the same; receive, from a third UE, third SCI related to a second transmission, for scheduling of a second PSSCH through a second PSCCH, within the active time; receive, from the third UE, a second MAC PDU related to the second transmission and fourth SCI related to the second transmission through the second PSSCH, within the active time; obtain a second L1 destination ID related to the second transmission and a second L1 source ID related to the third UE, based on the fourth SCI; obtain a second L1 destination ID related to the second transmission and a second L1 source ID related to the third UE, based on the fourth SCI; compare the 16 LSB of the first full L2 source ID with the second L1 destination ID; compare the 8 LSB of the first full L2 destination ID with the second L1 source ID; restart the inactivity timer, based on the 16 LSB of the first full L2 source ID and the second L1 destination ID being the same, and the 8 LSB of the first full L2 destination ID and the second L1 source ID being the same; obtain a first partial L2 destination ID related to the first transmission and a first partial L2 source ID related to the second UE based on the first MAC PDU; obtain a second full L2 destination ID related to the first transmission, based on the first L1 destination ID and the first partial L2 destination ID; obtain a second full L2 source ID related to the second UE, based on the first L1 source ID and the first partial L2 source ID; obtain a second partial L2 destination ID related to the second transmission and a second partial L2 source ID related to the third UE based on the second MAC PDU; obtain a third full L2 destination ID related to the second transmission, based on the second L1 destination ID and the second partial L2 destination ID; obtain a third full L2 source ID related to the third UE, based on the second L1 source ID and the second partial L2 source ID; and stop the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

According to an embodiment of the present disclosure, a non-transitory computer-readable storage medium storing instructions may be proposed. For example, the instructions, when executed, may cause a first device to: obtain a sidelink (SL) discontinuous reception (DRX) configuration; receive, from a second device, first sidelink control information (SCI) related to a first transmission, for scheduling of a first physical sidelink shared channel (PSSCH) through a first physical sidelink control channel (PSCCH), within an active time of the SL DRX configuration; receive, from the second device, a first medium access control (MAC) protocol data unit (PDU) related to the first transmission and second SCI related to the first transmission through the first PSSCH, within the active time; obtain a first layer (L) 1 destination identifier (ID) related to the first transmission and a first L1 source ID related to the second device, based on the second SCI; compare 16 least significant bits (LSB) of a first full L2 source ID of the first device with the first L1 destination ID; compare 8 LSB of a first full L2 destination ID of the first device with the first L1 source ID; start an inactivity timer of the SL DRX configuration, based on the 16 LSB of the first full L2 source ID and the first L1 destination ID being the same, and the 8 LSB of the first full L2 destination ID and the first L1 source ID being the same; receive, from a third device, third SCI related to a second transmission, for scheduling of a second PSSCH through a second PSCCH, within the active time; receive, from the third device, a second MAC PDU related to the second transmission and fourth SCI related to the second transmission through the second PSSCH, within the active time; obtain a second L1 destination ID related to the second transmission and a second L1 source ID related to the third device, based on the fourth SCI; obtain a second L1 destination ID related to the second transmission and a second L1 source ID related to the third device, based on the fourth SCI; compare the 16 LSB of the first full L2 source ID with the second L1 destination ID; compare the 8 LSB of the first full L2 destination ID with the second L1 source ID; restart the inactivity timer, based on the 16 LSB of the first full L2 source ID and the second L1 destination ID being the same, and the 8 LSB of the first full L2 destination ID and the second L1 source ID being the same; obtain a first partial L2 destination ID related to the first transmission and a first partial L2 source ID related to the second device based on the first MAC PDU; obtain a second full L2 destination ID related to the first transmission, based on the first L1 destination ID and the first partial L2 destination ID; obtain a second full L2 source ID related to the second device, based on the first L1 source ID and the first partial L2 source ID; obtain a second partial L2 destination ID related to the second transmission and a second partial L2 source ID related to the third device based on the second MAC PDU; obtain a third full L2 destination ID related to the second transmission, based on the second L1 destination ID and the second partial L2 destination ID; obtain a third full L2 source ID related to the third device, based on the second L1 source ID and the second partial L2 source ID; and stop the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

According to an embodiment of the present disclosure, a method for performing, by a second device, wireless communication, the method comprising: transmitting, to a first device, first SCI and a first MAC PDU, within an active time of an SL DRX configuration; and transmitting, to the first device, second SCI and a second MAC PDU, within the active time, wherein the active time may be a time during which an inactivity timer of the SL DRX configuration is running, wherein the inactivity timer may be started based on 16 LSB of a first full L2 source ID of the first device being the same as a first L1 destination ID included in the first SCI, and 8 LSB of a first full L2 destination ID of the first device being the same as a first L1 source ID included in the first SCI, wherein the inactivity timer may be restarted based on the 16 LSB of the first full L2 source ID being the same as a second L1 destination ID included in the second SCI, and the 8 LSB of the first full L2 destination ID being the same as a second L1 source ID included in the second SCI, wherein the inactivity timer may be not stopped, based on i) the first full L2 source ID being different from a second full L2 destination ID, or the first full L2 destination ID being different from a second full L2 source ID and ii) the first full L2 source ID being different from a third full L2 destination ID, or the first full L2 destination ID being different from a third full L2 source ID, being not determined, wherein the second full L2 destination ID may be obtained based on the first L1 destination ID and a first partial L2 destination ID included in the first MAC PDU, wherein the second full L2 source ID may be obtained based on the first L1 source ID and a first partial L2 source ID included in the first MAC PDU, wherein the third full L2 destination ID may be obtained based on the second L1 destination ID and a second partial L2 destination ID included in the second MAC PDU, and wherein the third full L2 source ID may be obtained based on the second L1 source ID and a second partial L2 source ID included in the second MAC PDU.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors execute the instructions to: transmit, to a first device, first SCI and a first MAC PDU, within an active time of an SL DRX configuration; and transmit, to the first device, second SCI and a second MAC PDU, within the active time, wherein the active time may be a time during which an inactivity timer of the SL DRX configuration is running, wherein the inactivity timer may be started based on 16 LSB of a first full L2 source ID of the first device being the same as a first L1 destination ID included in the first SCI, and 8 LSB of a first full L2 destination ID of the first device being the same as a first L1 source ID included in the first SCI, wherein the inactivity timer may be restarted based on the 16 LSB of the first full L2 source ID being the same as a second L1 destination ID included in the second SCI, and the 8 LSB of the first full L2 destination ID being the same as a second L1 source ID included in the second SCI, wherein the inactivity timer may be not stopped, based on i) the first full L2 source ID being different from a second full L2 destination ID, or the first full L2 destination ID being different from a second full L2 source ID and ii) the first full L2 source ID being different from a third full L2 destination ID, or the first full L2 destination ID being different from a third full L2 source ID, being not determined, wherein the second full L2 destination ID may be obtained based on the first L1 destination ID and a first partial L2 destination ID included in the first MAC PDU, wherein the second full L2 source ID may be obtained based on the first L1 source ID and a first partial L2 source ID included in the first MAC PDU, wherein the third full L2 destination ID may be obtained based on the second L1 destination ID and a second partial L2 destination ID included in the second MAC PDU, and wherein the third full L2 source ID may be obtained based on the second L1 source ID and a second partial L2 source ID included in the second MAC PDU.

A UE can efficiently perform sidelink communication.

BRIEF DESCRIPTION OF THE DRAWINGS

FIGS. 13A and 13B show a procedure for a first device to perform wireless communication, according to one embodiment of the present disclosure.

FIG. 18 shows another example of a wireless device, based on an embodiment of the present disclosure.

FIG. 19 shows a hand-held device, based on an embodiment of the present disclosure.

DETAILED DESCRIPTION

Figure 1:
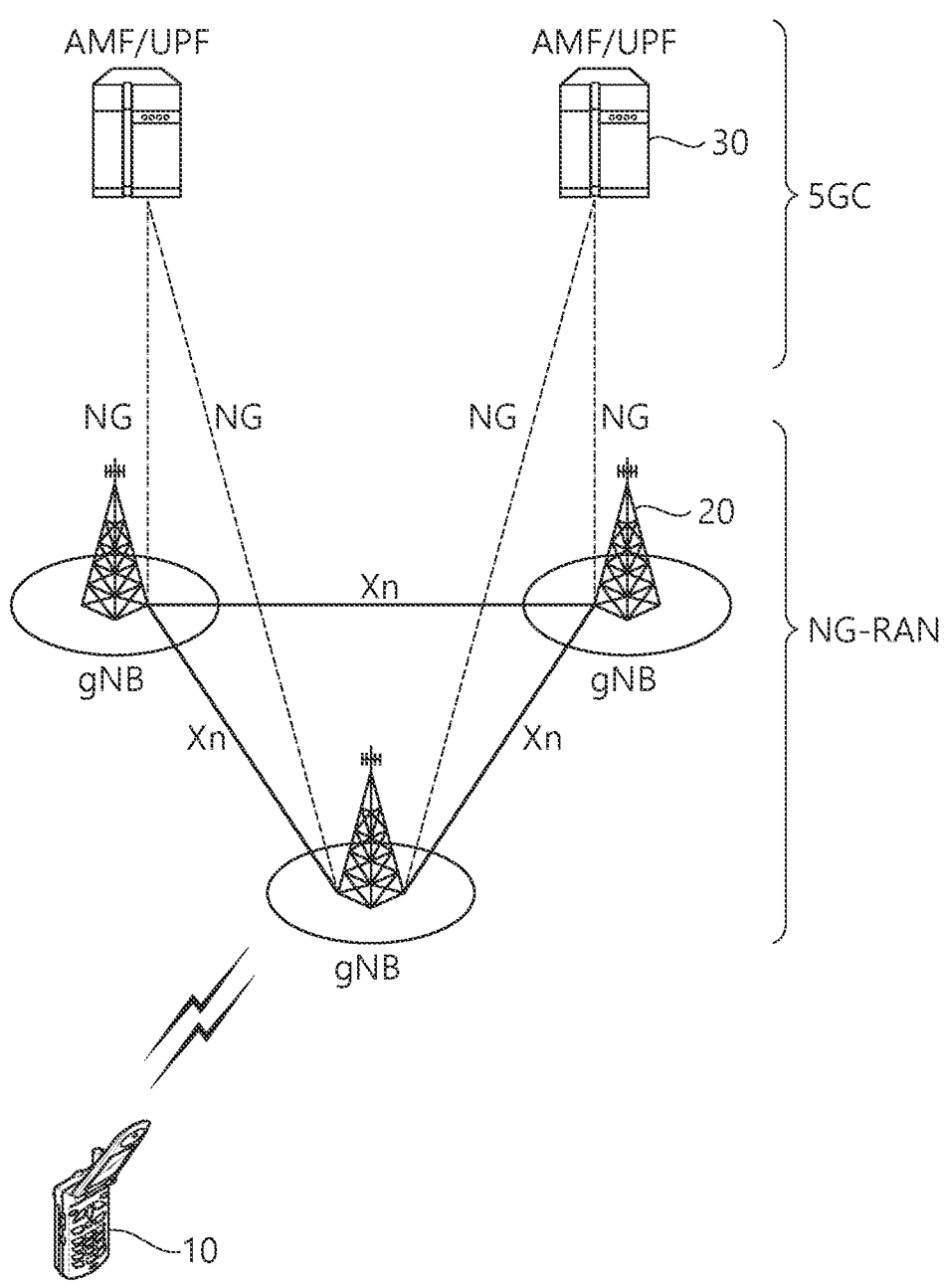
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A. B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B. C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and pro-vides backward compatibility with a system based on the IEEE 802.16e. The UTRA is part of a universal mobile telecommunication system (UMTS). 3rd generation partner-ship project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A correspond-ing to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclo-sure will not be limited only to this.

For terms and techniques used herein that are not spe-cifically described, reference may be made to wireless communication standards documents published prior to the filing of this specification.

FIG. 1 shows a structure of an NR system, based on an embodiment of the present disclosure. The embodiment of FIG. 1 may be combined with various embodiments of the present disclosure.

Referring to FIG. 1, a next generation-radio access net-work (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
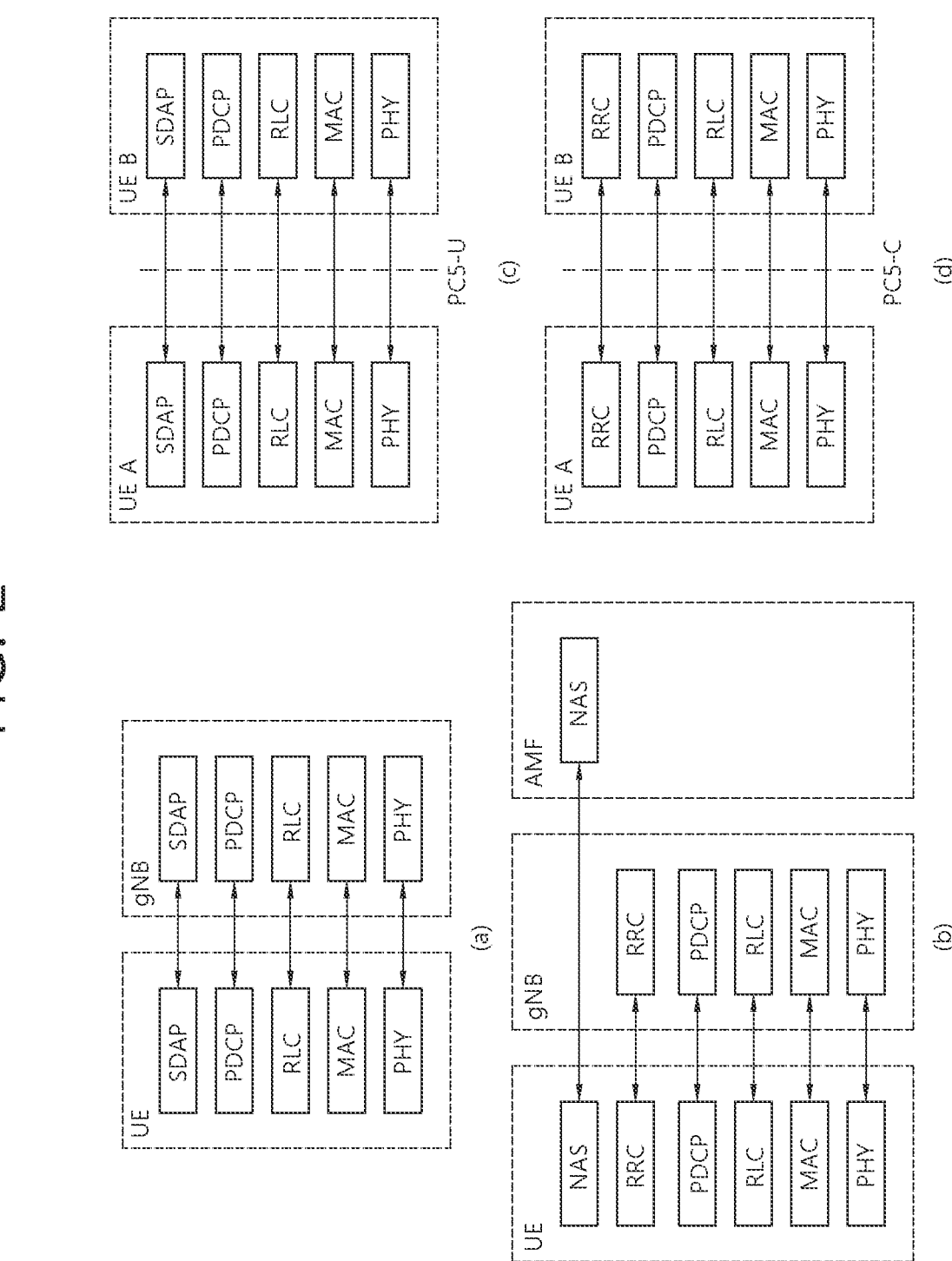
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
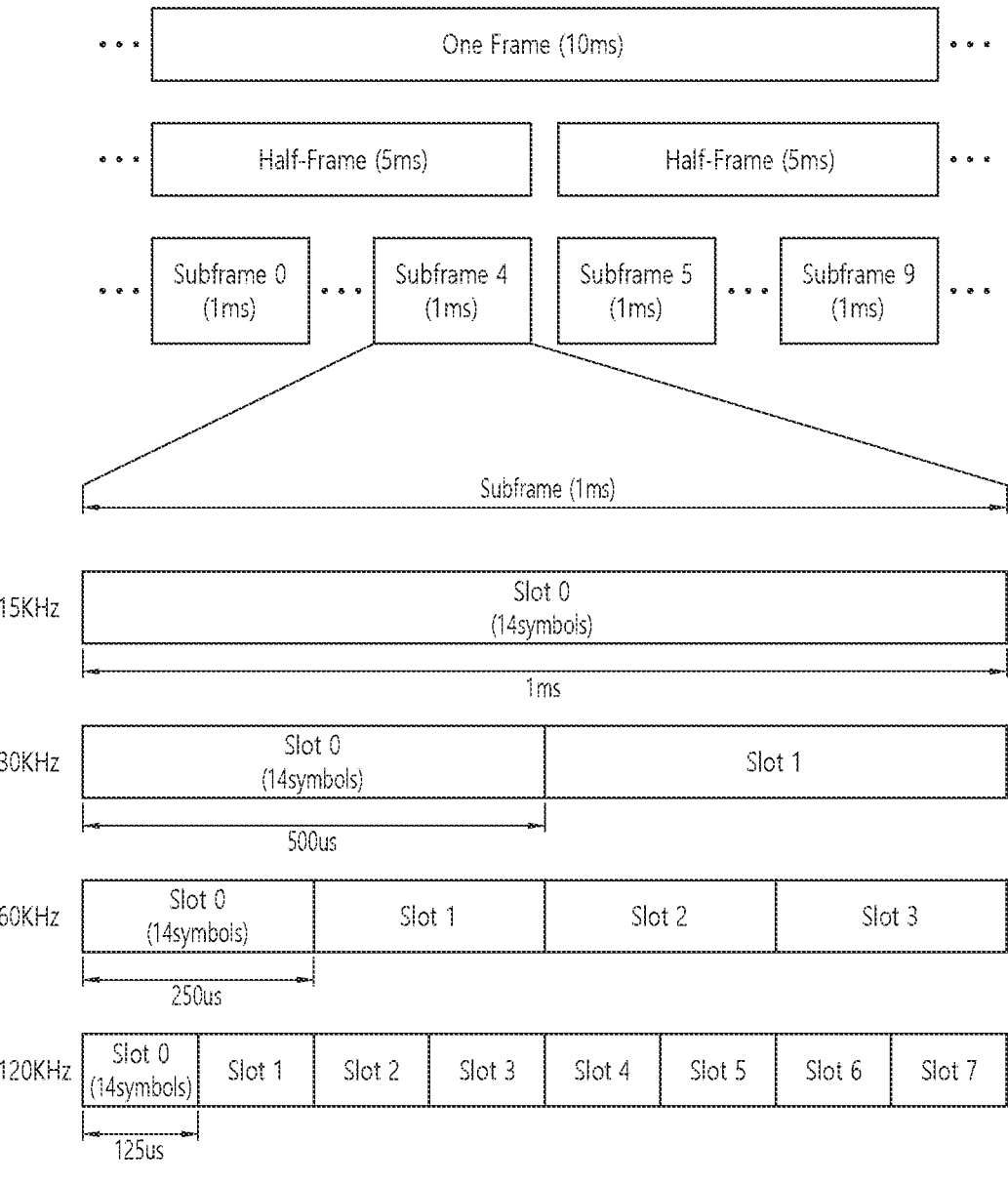
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,\ u}_{slot}$ | $N^{subframe,\ u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,\ u}_{slot}$ | $N^{subframe,\ u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise. An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
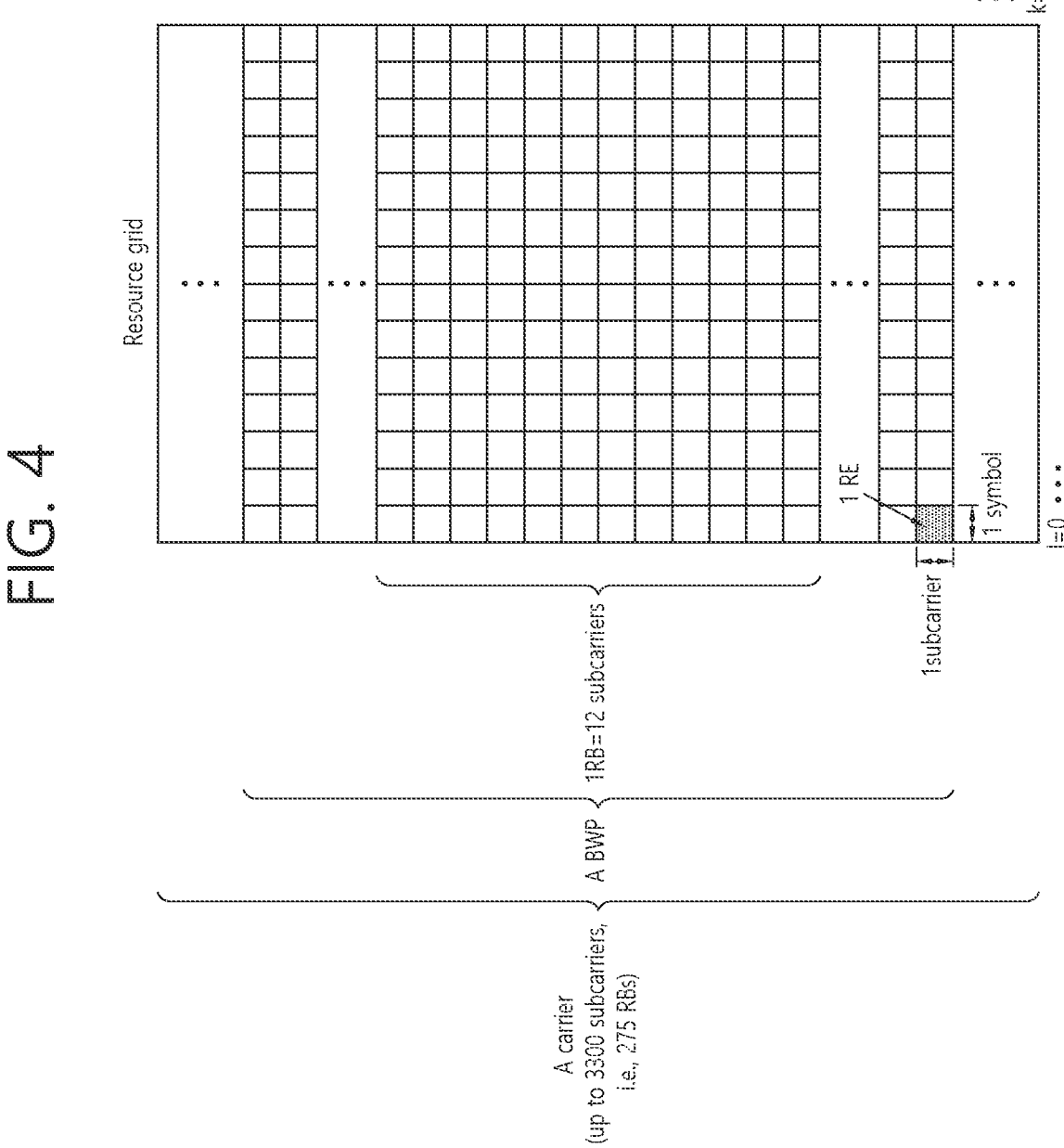
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
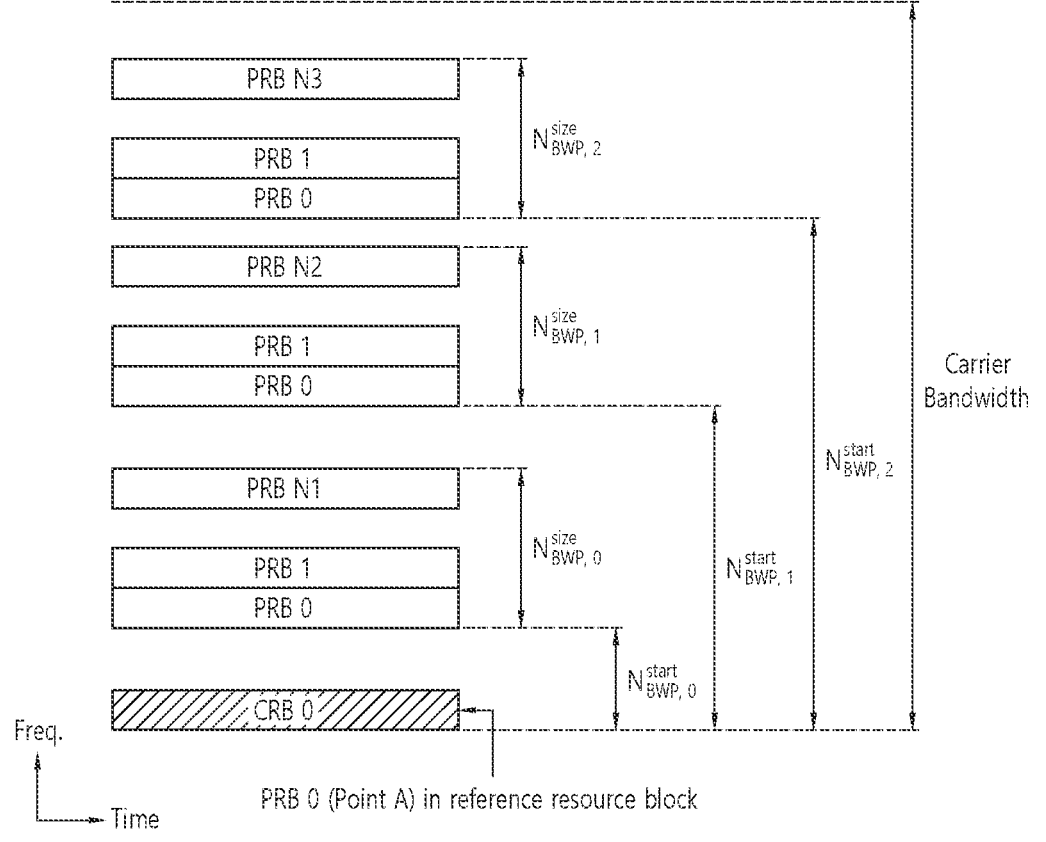
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A. and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
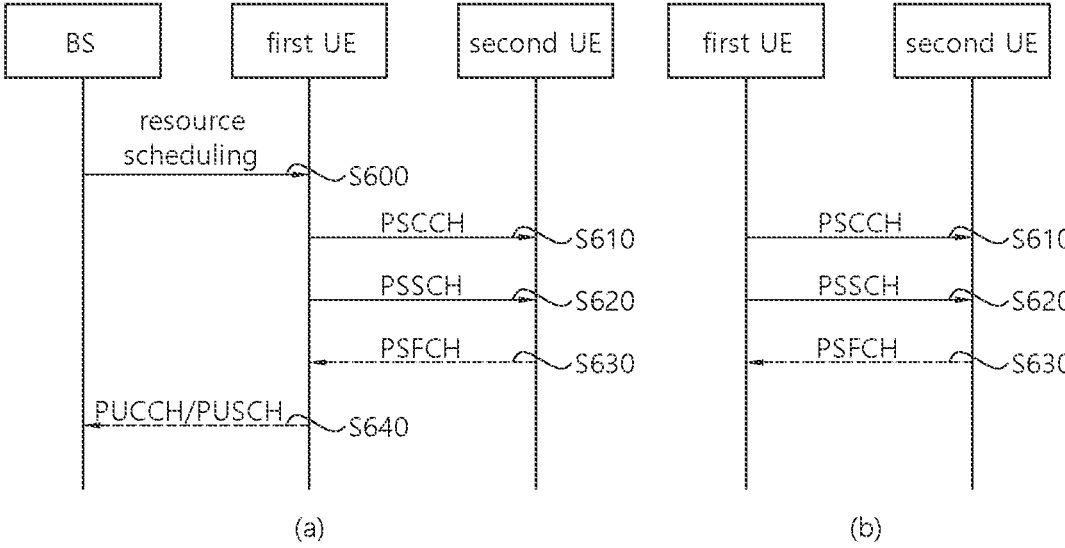
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling $(\log_2 (N^{SL}_{subChannel}(N^{SL}_{subChannel}+1)/2))$ bits when the value of the higher layer parameter sl-MaxNumPerReserve is configured to 2; otherwise ceiling $\log_2(N^{SL}_{subChannel}(N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits
Destination ID—16 bits
HARQ feedback enabled/disabled indicator—1 bit
Cast type indicator—2 bits as defined in Table 7
CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
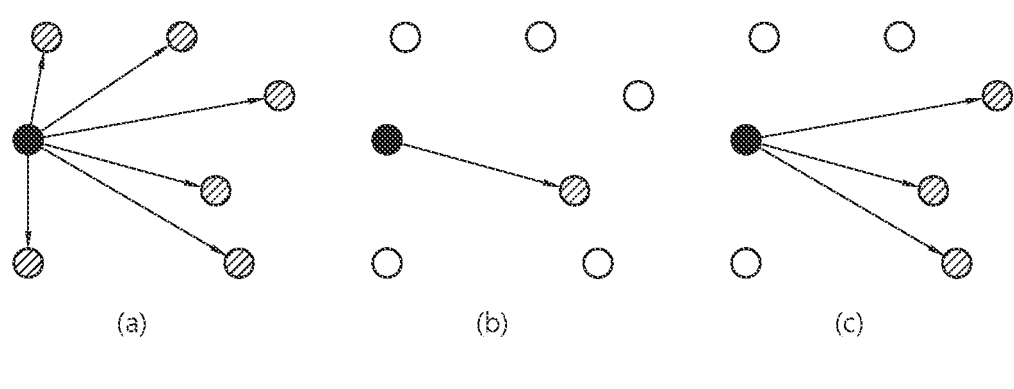
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, FIG. 7(a) shows a broadcast type of SL communication, FIG. 7(b) shows a unicast type of SL communication, and FIG. 7(c) shows a groupcast type of SL communication. In the case of unicast type SL communication, a UE may perform one-to-one communication with other UEs. In the case of groupcast type SL communication, a UE may perform SL communication with one or more UEs in a group to which it belongs. In various embodiments of the present disclosure, SL groupcast communication may be replaced by SL multicast communication, SL one-to-many communication, and the like.

In this specification, the wording "configuration or definition" may be interpreted as being configured (in advance) by a base station or network (e.g., through predefined signaling (e.g., SIB signaling, MAC signaling, RRC signaling). For example, "A may be configured" may include "a base station or network (pre)configures/defines or informs the UE of A". Alternatively, the wording "configuration or definition" may be interpreted as being configured or defined in advance by the system. For example, "A may be configured" may include "A is configured/defined in advance by the system".

Referring to the standard document, some procedures and technical specifications related to this disclosure are shown in below.

TABLE 8

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1:    If Sidelink resource allocation mode 1 is configured by RRC, a DRX functionality is not configured.

RRC controls DRX operation by configuring the following parameters:

-    drx-onDurationTimer: the duration at the beginning of a DRX cycle;
-    drx-SlotOffset: the delay before starting the drx-onDurationTimer;
-    drx-InactivityTimer: the duration after the PDCCH occasion in which a PDCCH indicates a new UL or DL transmission for the MAC entity;
-    drx-RetransmissionTimerDL (per DL HARQ process except for the broadcast process): the maximum duration until a DL retransmission is received;
-    drx-RetransmissionTimerUL (per UL HARQ process): the maximum duration until a grant for UL retransmission is received;
-    drx-LongCycleStartOffset: the Long DRX cycle and drx-StartOffset which defines the subframe where the Long and Short DRX cycle starts;
-    drx-ShortCycle (optional): the Short DRX cycle;
-    drx-ShortCycleTimer (optional): the duration the UE shall follow the Short DRX cycle;
-    drx-HARQ-RTT-TimerDL (per DL HARQ process except for the broadcast process): the minimum duration before a DL assignment for HARQ retransmission is expected by the MAC entity;
-    drx-HARQ-RTT-TimerUL (per UL HARQ process): the minimum duration before a UL HARQ retransmission grant is expected by the MAC entity;
-    ps-Wakeup (optional): the configuration to start associated drx-onDurationTimer in case DCP is monitored but not detected;
-    ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
-    ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

TABLE 8-continued

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

TABLE 9

When a DRX cycle is configured, the Active Time for Serving Cells in a DRX group includes the time while:
- drx-onDurationTimer or drx-InactivityTimer configured for the DRX group is running; or
- drx-RetransmissionTimerDL or drx-RetransmissionTimerUL is running on any Serving Cell in the DRX group; or
- ra-ContentionResolutionTimer (as described in clause 5.1.5) or msgB-ResponseWindow (as described in clause 5.1.4a) is running; or
- a Scheduling Request is sent on PUCCH and is pending (as described in clause 5.4.4); or
- a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).
When DRX is configured, the MAC entity shall:
  1>  if a MAC PDU is received in a configured downlink assignment:
      2>  start the drx-HARQ-RTT-TimerDL for the corresponding HARQ process in the first symbol after the end of the corresponding transmission carrying the DL HARQ feedback;
      2>  stop the drx-RetransmissionTimerDL for the corresponding HARQ process.
  1>  if a MAC PDU is transmitted in a configured uplink grant and LBT failure indication is not received from lower layers:
      2>  start the drx-HARQ-RTT-TimerUL for the corresponding HARQ process in the first symbol after the end of the first repetition of the corresponding PUSCH transmission;
      2>  stop the drx-RetransmissionTimerUL for the corresponding HARQ process.
  1>  if a drx-HARQ-RTT-TimerDL expires:
      2>  if the data of the corresponding HARQ process was not successfully decoded:
         3>  start the drx-RetransmissionTimerDL for the corresponding HARQ process in the first symbol after the expiry of drx-HARQ-RTT-TimerDL.
  1>  if a drx-HARQ-RTT-TimerUL expires:
      2>  start the drx-RetransmissionTimerUL for the corresponding HARQ process in the first symbol after the expiry of drx-HARQ-RTT-TimerUL.
  1>  if a DRX Command MAC CE or a Long DRX Command MAC CE is received:
      2>  stop drx-onDurationTimer for each DRX group;
      2>  stop drx-InactivityTimer for each DRX group.
  1>  if drx-InactivityTimer for a DRX group expires:
      2>  if the Short DRX cycle is configured:
         3>  start or restart drx-ShortCycleTimer for this DRX group in the first symbol after the expiry of drx-InactivityTimer;
         3>  use the Short DRX cycle for this DRX group.
      2>  else:
         3>  use the Long DRX cycle for this DRX group.
  1>  if a DRX Command MAC CE is received:
      2>  if the Short DRX cycle is configured:
         3>  start or restart drx-ShortCycleTimer for each DRX group in the first symbol after the end of DRX Command MAC CE reception;
         3>  use the Short DRX cycle for each DRX group.
      2>  else:
         3>  use the Long DRX cycle for each DRX group.
  1>  if drx-ShortCycleTimer for a DRX group expires:
      2>  use the Long DRX cycle for this DRX group.
  1>  if a Long DRX Command MAC CE is received:
      2>  stop drx-ShortCycleTimer for each DRX group;
      2>  use the Long DRX cycle for each DRX group.
  1>  if the Short DRX cycle is used for a DRX group, and [(SFN × 10) + subframe number] modulo (drx-ShortCycle) = (drx-StartOffset) modulo (drx-ShortCycle):
      2>  start drx-onDurationTimer for this DRX group after drx-SlotOffset from the beginning of the subframe.

TABLE 10

1>  if the Long DRX cycle is used for a DRX group, and [(SFN × 10) + subframe number] modulo (drx-LongCycle) = drx-StartOffset:
      2>  if DCP monitoring is configured for the active DL BWP as specified in TS 38.213 [6], clause 10.3:

TABLE 10-continued

|  | 3> | if DCP indication associated with the current DRX cycle received from lower layer indicated to start drx-onDurationTimer, as specified in TS 38.213 [6]; or |
|  | 3> | if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or |
|  | 3> | if ps-Wakeup is configured with value true and DCP indication associated with the current DRX cycle has not been received from lower layers: |
|  |  | 4> start drx-onDurationTimer after drx-SlotOffset from the beginning of the subframe. |
| 2> | else: | |
|  | 3> | start drx-onDurationTimer for this DRX group after drx-SlotOffset from the beginning of the subframe. |
| NOTE 2: | | In case of unaligned SFN across carriers in a cell group, the SFN of the SpCell is used to calculate the DRX duration. |
| 1> | if a DRX group is in Active Time: | |
| 2> | monitor the PDCCH on the Serving Cells in this DRX group as specified in TS 38.213 [6]; | |
| 2> | if the PDCCH indicates a DL transmission: | |
|  | 3> | start the drx-HARQ-RTT-TimerDL for the corresponding HARQ process in the first symbol after the end of the corresponding transmission carrying the DL HARQ feedback; |
| NOTE 3: | | When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback. |
|  | 3> | stop the drx-RetransmissionTimerDL for the corresponding HARQ process. |
|  | 3> | if the PDSCH-to-HARQ_feedback timing indicate a non-numerical k1 value as specified in TS 38.213 [6]: |
|  |  | 4> start the drx-RetransmissionTimerDL in the first symbol after the PDSCH transmission for the corresponding HARQ process. |
| 2> | if the PDCCH indicates a UL transmission: | |
|  | 3> | start the drx-HARQ-RTT-TimerUL for the corresponding HARQ process in the first symbol after the end of the first repetition of the corresponding PUSCH transmission; |
|  | 3> | stop the drx-RetransmissionTimerUL for the corresponding HARQ process. |
| 2> | if the PDCCH indicates a new transmission (DL or UL) on a Serving Cell in this DRX group: | |
|  | 3> | start or restart drx-InactivityTimer for this DRX group in the first symbol after the end of the PDCCH reception. |
| 2> | if a HARQ process receives downlink feedback information and acknowledgement is indicated: | |
|  | 3> | stop the drx-RetransmissionTimerUL for the corresponding HARQ process. |

TABLE 11

| 1> | if DCP monitoring is configured for the active DL BWP as specified in TS 38.213 [6], clause 10.3; and | |
| 1> | if the current symbol n occurs within drx-onDurationTimer duration; and | |
| 1> | if drx-onDurationTimer associated with the current DRX cycle is not started as specified in this clause: | |
| 2> | if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause: | |
|  | 3> | not transmit periodic SRS and semi-persistent SRS defined in TS 38.214 [7]; |
|  | 3> | not report semi-persistent CSI configured on PUSCH; |
|  | 3> | if ps-TransmitPeriodicL1-RSRP is not configured with value true: |
|  |  | 4> not report periodic CSI that is L1-RSRP on PUCCH. |
|  | 3> | if ps-TransmitOtherPeriodicCSI is not configured with value true: |
|  |  | 4> not report periodic CSI that is not L1-RSRP on PUCCH. |
| 1> | else: | |
| 2> | in current symbol n, if a DRX group would not be in Active Time considering grants/assignments scheduled on Serving Cell(s) in this DRX group and DRX Command MAC CE/Long DRX Command MAC CE received and Scheduling Request sent until 4 ms prior to symbol n when evaluating all DRX Active Time conditions as specified in this clause: | |
|  | 3> | not transmit periodic SRS and semi-persistent SRS defined in TS 38.214 [7] in this DRX group; |
|  | 3> | not report CSI on PUCCH and semi-persistent CSI configured on PUSCH in this DRX group. |

TABLE 11-continued

```
    2>    if CSI masking (csi-Mask) is setup by upper layers:
          3>   in current symbol n, if drx-onDurationTimer of a DRX group would not be running
               considering grants/assignments scheduled on Serving Cell(s) in this DRX group and
               DRX Command MAC CE/Long DRX Command MAC CE received until 4 ms prior to
               symbol n when evaluating all DRX Active Time conditions as specified in this clause;
               and
               4>   not report CSI on PUCCH in this DRX group.
    NOTE 4:      If a UE multiplexes a CSI configured on PUCCH with other overlapping UCI(s)
                 according to the procedure specified in TS 38.213 [6] clause 9.2.5 and this CSI
                 multiplexed with other UCI(s) would be reported on a PUCCH resource outside DRX
                 Active Time of the DRX group in which this PUCCH is configured, it is up to UE
                 implementation whether to report this CSI multiplexed with other UCI(s).
Regardless of whether the MAC entity is monitoring PDCCH or not on the Serving Cells in a DRX
group,
the MAC entity transmits HARQ feedback, aperiodic CSI on PUSCH, and aperiodic SRS defined in TS
38.214 [7] on the Serving Cells in the DRX group when such is expected.
The MAC entity needs not to monitor the PDCCH if it is not a complete PDCCH occasion (e.g. the
Active Time starts or ends in the middle of a PDCCH occasion).
```

On the other hand, NR V2X in Release 16 did not support power-saving operation of devices, and Release 17 NR V2X will support power-saving operation of devices (e.g., power-saving devices).

For example, for power saving operation (e.g., SL (side-link) DRX operation) of a UE, an SL DRX configuration to be used by a P-UE (power saving UE) may need to be defined. In addition, the operation of transmitting and receiving UEs during the on-duration (when sidelink reception/transmission can be performed) and off-duration (when they operate in sleep mode) may need to be defined. For example, the SL DRX configuration may include SL DRX cycle, SL DRX on-duration, SL DRX off-duration, timer to support SL DRX operation, etc.

For example, an SL DRX operation (e.g., an SL DRX timer operation) of a receiving UE may be differently applied according to a resource selection/reservation operation of a transmitting UE. In addition, for example, the present disclosure may be a solution which may be applicable to SL unicast/groupcast/broadcast communication.

In embodiment(s) of the present disclosure, a method for performing an operation related to stopping of an SL DRX inactivity timer based on a UE ID (L1 destination ID or L2 destination ID) is proposed. In the following descriptions, "when, if, in case of" may be replaced with "based on".

According to the prior art, in SL DRX operation, a receiving UE may operate an SL DRX inactivity timer as follows.

For example, an interval during which an SL DRX inactivity timer is running may be an interval that extends an SL DRX on-duration interval, which is an interval during which a UE performing an SL DRX operation must operate as an active time by default to receive PSCCH/PSSCH from the counterpart UE. That is, an SL DRX on-duration timer may be extended by an SL DRX inactivity timer interval. Furthermore, when a UE receives a PSCCH (1st SCI and/or 2nd SCI) for a new TB, or a new packet (new PSSCH transmission) from the counterpart UE, the UE may extend an SL DRX on-duration timer by starting an SL DRX inactivity timer.

For example, in SL unicast communication, when a receiving UE receives a PSCCH/PSSCH (including 1st SCI and 2nd SCI) for a new TB transmitted by a transmitting UE, the receiving UE checks an 8 bits Layer 1 (L1) source ID and a 16 bits L1 destination ID included in the received SCI, and if the transmitting UE is a UE with which it has a unicast connection (by checking the L1 source ID included in the received SCI and the partial bits of its own unicast destination ID), and if it determines that it is the intended UE of the transmission (by checking the L1 destination ID included in the received SCI and the partial bits of its own unicast source ID), the receiving UE may (re)start an SL DRX inactivity timer.

Further, for example, if a receiving UE successfully receives a PSCCH/PSSCH transmitted by a transmitting UE, the receiving UE may check partial source/destination ID bits included in a MAC subheader of the decoded MAC PDU. If a receiving UE confirms that it is not the intended receiving UE by checking a partial source/destination ID included in a MAC header, it may stop a previously started SL DRX inactivity timer (started based on matching of L1 IDs). For example, when a receiving UE checks partial source/destination IDs included in a MAC header, the receiving UE may obtain 24-bit full L2 source/destination ID information by combining an L1 source/destination ID included in SCI and a partial source/destination ID included in a MAC header.

According to one embodiment of the present disclosure, if a receiving UE has started an SL DRX inactivity timer due to L1 ID matching, a method of not stopping a previously started SL DRX inactivity timer (started due to matching of the L1 ID) even if 24-bit L2 IDs (24-bit full L2 ID obtained by combining L1 ID included in SCI and partial L2 ID bits included in a MAC subheader) mismatch, is proposed under the following conditions.

That is, for example, if an SL DRX inactivity timer started by matching of L1 IDs in a previously received SL TB (or, data) is running, a method of not stopping the running SL DRX inactivity timer until the check of L2 ID matching of the SL TB is completed, even if the SL DRX inactivity timer is restarted by matching of L1 IDs for a newly received SL TB and it is confirmed that L2 IDs mismatch for the newly received SL TB, is proposed. That is, if an SL DRX inactivity timer started by matching of L1 IDs in a previously received SL TB is running, a method of stopping the running SL DRX inactivity timer after L2 ID matching check of the SL TB is completed, if the SL DRX inactivity timer is restarted by matching of L1 IDs for a newly received SL TB, and if it is confirmed that L2 IDs mismatch for the newly received SL TB, is proposed.

Figure 8:
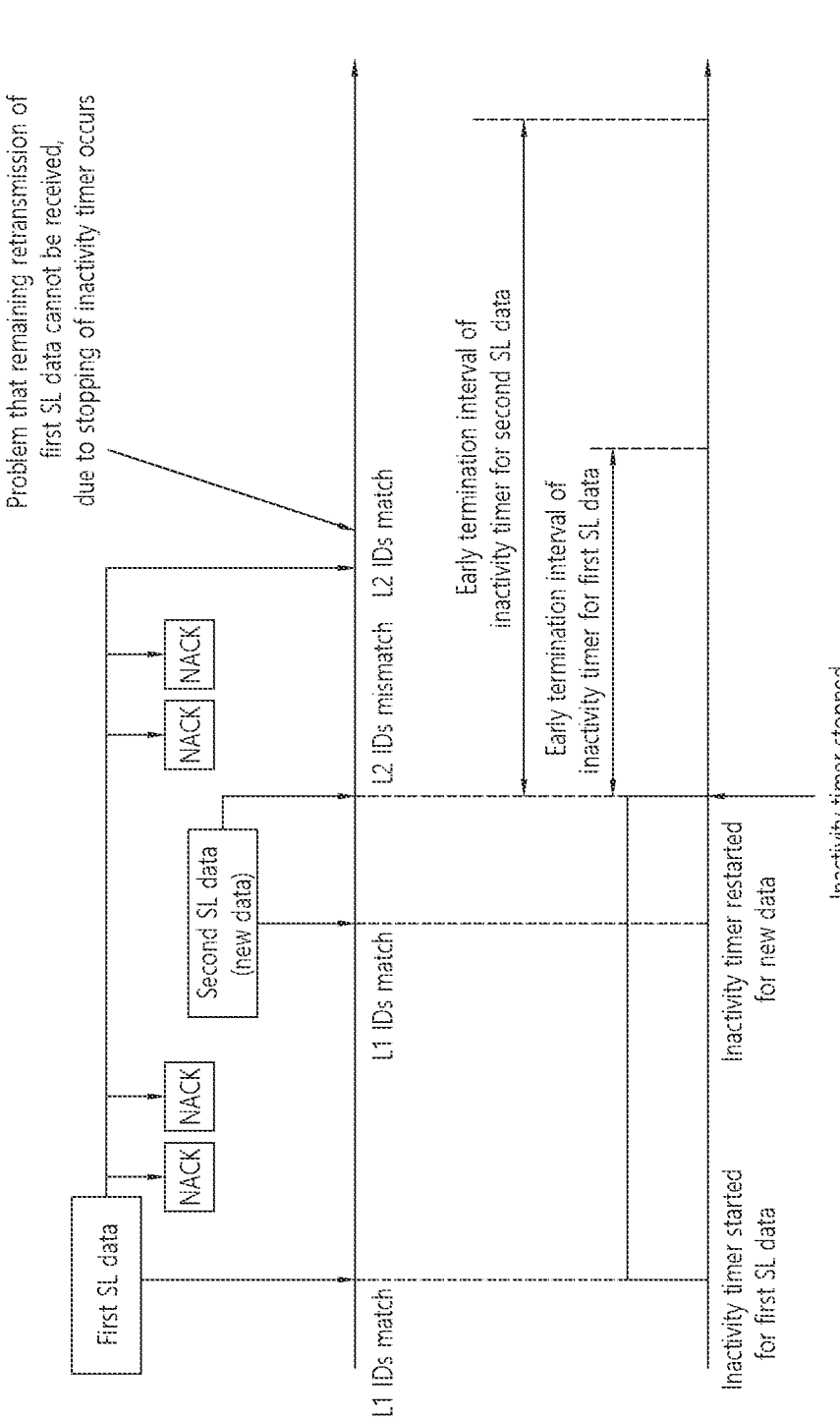
FIG. 8 shows an embodiment related to the operation of an SL DRX inactivity timer, according to one embodiment of the present disclosure.

FIG. 8 shows an embodiment related to the operation of an SL DRX inactivity timer, according to one embodiment of the present disclosure. The embodiment of FIG. 8 may be combined with various embodiments of the present disclosure.

Referring to FIG. 8, for example, if the proposed method of the present disclosure is not applied, the following problems may occur. As shown in FIG. 8, a receiving UE may receive the first SL data (or, TB) and check an L1 ID included in SCI. For example, the checked L1 ID may be a source/destination L1 ID in the case of unicast, or an L1 destination ID in the case of groupcast/broadcast.

For example, the receiving UE may check whether the L1 ID included in the identified SCI and its own ID match. For example, the receiving UE's own ID may be a partial bit of the destination/source L2 ID in the case of unicast, or a partial bit of the destination L2 ID of the service of interest in the case of groupcast/broadcast.

For example, the receiving UE may increase an active time by an SL DRX inactivity timer, based on matching of an L1 ID included in SCI and an its own L1 ID, by starting an SL DRX inactivity timer. For example, if a receiving UE continues to fail to decode the first SL data (e.g., HARQ NACK) and thus fails to perform a check for an L2 ID included in a MAC subheader, the receiving UE may monitor a retransmitted PSCCH/PSSCH for the first SL data from a transmitting UE for the remaining interval during which an SL DRX inactivity timer is running.

In this case, for example, if a receiving UE receives new second SL data from a transmitting UE and checks an L2 ID for the second SL data after restarting an SL DRX inactivity timer based on matching of L1 IDs (i.e., the decoding for PSCCH/PSSCH is successful and a MAC subheader is successfully checked), if an SL DRX inactivity timer that is running is stopped due to L2 IDs mismatching, the remaining active time may be early terminated and the receiving UE may not receive the retransmission of the first SL data to the end, as shown in FIG. 8.

Through the method proposed in this disclosure, the problem mentioned in FIG. 8, i.e., that a receiving UE may not receive SL retransmission data due to early termination of an active time for receiving SL data, may be prevented.

Figure 9:
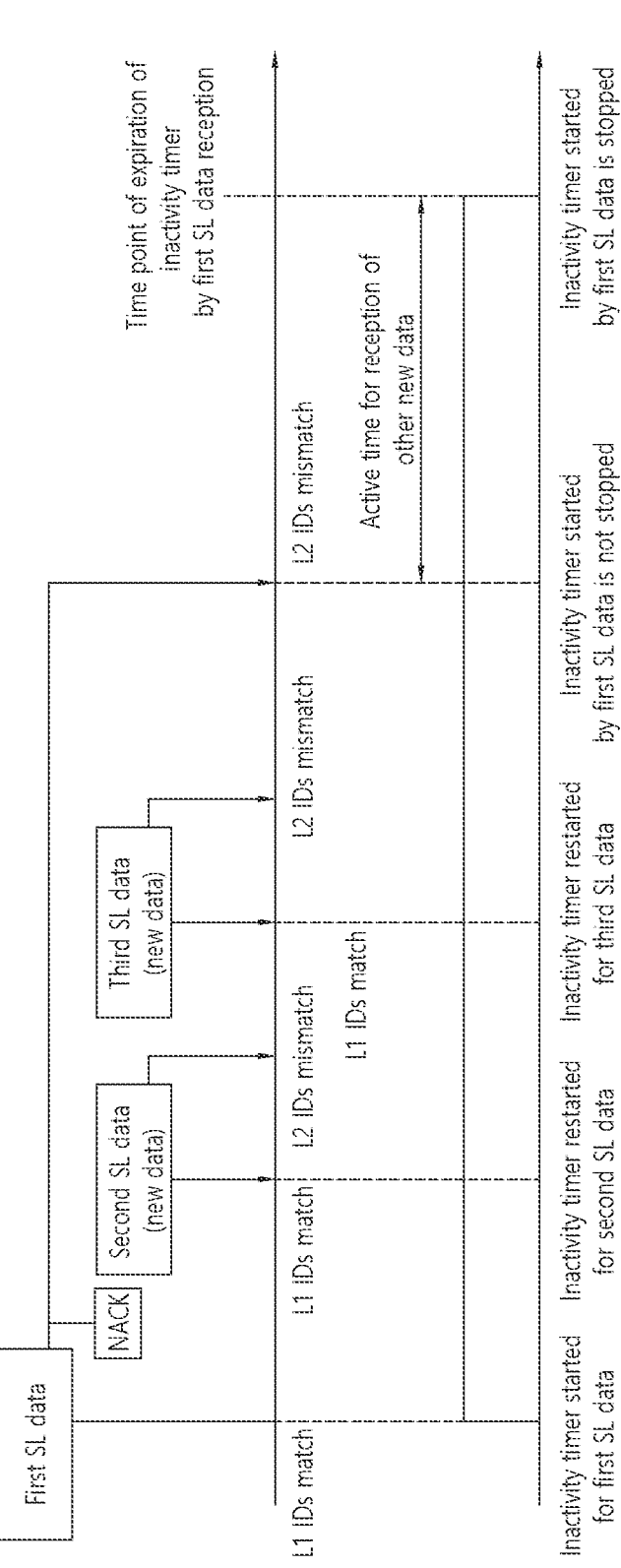
FIG. 9 shows an embodiment related to stopping an SL DRX inactivity timer, according to one embodiment of the present disclosure.

FIG. 9 shows an embodiment related to stopping an SL DRX inactivity timer, according to one embodiment of the present disclosure. The embodiment of FIG. 9 may be combined with various embodiments of the present disclosure.

Referring to FIG. 9, an example is shown where a receiving UE receives multiple SL data. For example, in the absence of a running SL DRX inactivity timer, a receiving UE may receive new SL data and start an SL DRX inactivity timer. Here, the started timer may be the SL DRX inactivity timer started by the first SL data in FIG. 9.

For example, while the SL DRX inactivity timer is running, and before it expires, a receiving UE may receive new SL data and restart or extend the running SL DRX inactivity timer. Here, the restarted or extended timer may be the SL DRX inactivity timer that is restarted due to the reception of the second SL data/third SL data in FIG. 9.

For example, in this case, a method of not stopping an SL DRX inactivity timer started by first SL data, even if PSSCH decoding of first SL data/second SL data/third SL data are successful and all 24-bit full IDs (source/destination ID or destination ID) are confirmed to be mismatched by a receiving UE before an SL DRX inactivity timer started by first SL data expires, is proposed. In other words, until an SL DRX inactivity timer started by first SL data expires, an interval during which monitoring of additional SL data may be performed, may be guaranteed based on successful SCI decoding and L1 ID matching (source/destination ID or destination ID) of the first SL data.

Furthermore, if, for example, the receiving UE determines that L2 IDs for all SL data received until the expiration of the SL DRX inactivity timer started by the first SL data mismatch, the receiving UE may stop the SL DRX inactivity timer at the time point of the expiration of the SL DRX inactivity timer started by the first SL data. That is, for example, the inactivity timer extended by the second SL data, the third SL data, etc. may also stop at this time point.

Figure 10:
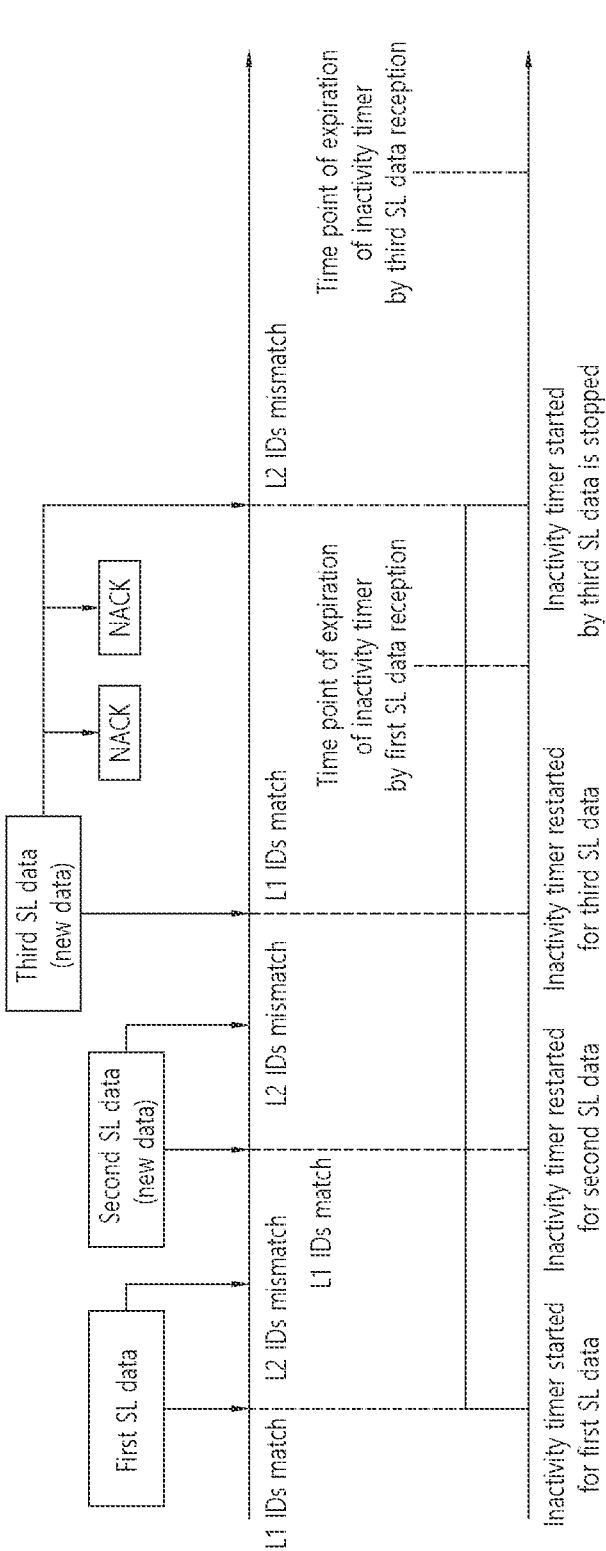
FIG. 10 shows an embodiment related to stopping an SL DRX inactivity timer, according to one embodiment of the present disclosure.

FIG. 10 shows an embodiment related to stopping an SL DRX inactivity timer, according to one embodiment of the present disclosure. The embodiment of FIG. 10 may be combined with various embodiments of the present disclosure.

Referring to FIG. 10, an example of a receiving UE receiving a plurality of SL data is shown. For example, the receiving UE may receive new SL data and start an SL DRX inactivity timer in the absence of a running SL DRX inactivity timer. Here, the started timer may be the SL DRX inactivity timer started by the first SL data in FIG. 10.

For example, even if the time point of the expiration of the SL DRX inactivity timer (the time point of the expiration of the inactivity timer started by the reception of the first SL data) is reached, the L2 ID check of the second SL data/third SL data received before the time point of the expiration of the SL DRX inactivity timer may not be completed. For example, this may be the case when the receiving UE has not been able to perform the MAC subheader decoding of the second SL data/third SL data due to the occurrence of a HARQ NACK. In this case, the receiving UE may continue to perform monitoring for a retransmission of SL data during the interval of the SL DRX inactivity timer extended by the second SL data/third SL data. For example, this operation may be to determine whether it is the intended receiving UE by checking L2 IDs.

For example, as shown in FIG. 10, before an SL DRX inactivity timer extended by third SL data expires, a receiving UE may successfully decode the third SL data and check its L2 ID and determine that it is not the intended receiving UE based on the 24-bit L2 IDs mismatch. In this case, that is, if the receiving UE determines that it is not the intended receiving UE for all data including the third SL data, the receiving UE may immediately stop the extended SL DRX inactivity timer (even if the SL DRX inactivity timer has not expired) and no longer monitor a PSCCH/PSSCH transmitted by the transmitting UE. Here, for example, the receiving UE may not perform any monitoring for data reception, but may exceptionally perform PSCCH monitoring for sensing.

Figure 11:
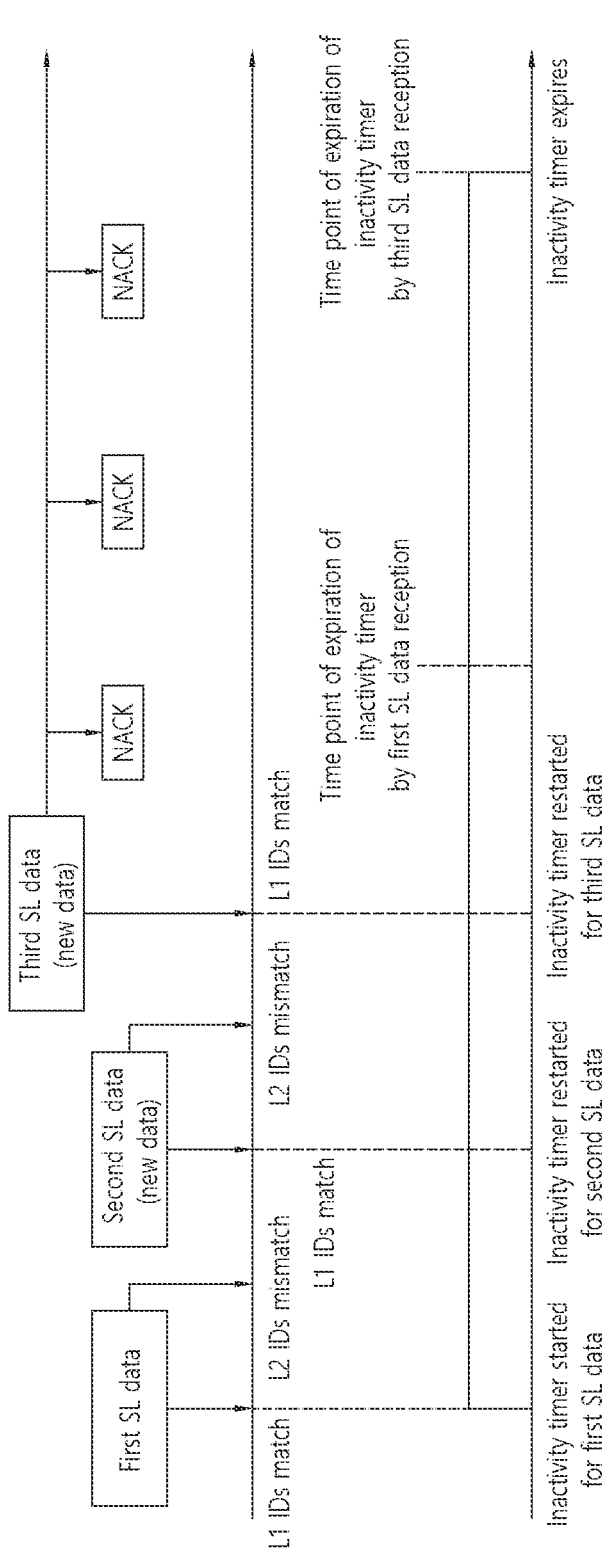
FIG. 11 shows an embodiment related to stopping an SL DRX inactivity timer, according to one embodiment of the present disclosure.

FIG. 11 shows an embodiment related to stopping an SL DRX inactivity timer, according to one embodiment of the present disclosure. The embodiment of FIG. 11 may be combined with various embodiments of the present disclosure.

Referring to FIG. 11, an example is shown where a receiving UE receives multiple SL data. For example, the receiving UE may receive new SL data and start an SL DRX inactivity timer in the absence of a running SL DRX inactivity timer. Here, the started timer may be the SL DRX inactivity timer started by the first SL data in FIG. 11.

For example, even if the time point of the expiration of the SL DRX inactivity timer (the time point of expiration of the inactivity timer started by the reception of the first SL data) is reached, L2 ID check of the second SL data/third SL data received before the time point of expiration of the SL DRX inactivity timer may not be completed. For example, this may be the case when the receiving UE has not been able to perform the MAC subheader decoding of the second SL data/third SL data due to the occurrence of a HARQ NACK.

In this case, the receiving UE may continuously perform monitoring for a retransmission of SL data during the interval of the SL DRX inactivity timer extended by the second SL data/third SL data. For example, this operation may be to determine whether it is the intended receiving UE by checking L2 IDs.

destination ID of the receiving UE. Based on whether the L2 ID matching is successful or not, the running SL DRX inactivity timer may be stopped or maintained, according to embodiments of the present disclosure.

The SL DRX configurations referred to in the present disclosure may include at least one or more of the parameters in shown in below.

TABLE 12

| Sidelink DRX configurations |
| --- |
| ✓ SL drx-onDurationTimer: the duration at the beginning of a DRX Cycle; |
| ✓ SL drx-SlotOffset: the delay before starting the drx-onDurationTimer; |
| ✓ SL drx-InactivityTimer: the duration after the PSCCH occasion in which a PSCCH indicates a new SL transmission for the MAC entity; |
| ✓ SL drx-RetransmissionTimer (per Sidelink process): the maximum duration until a retransmission is received; |
| ✓ SL drx-HARQ-RTT-Timer (per Sidelink process): the minimum duration before PSCCH (Sidelink Control Information) & PSSCH for SL HARQ retransmission is expected by the MAC entity; |
| ✓ SL drx-LongCycleStartOffset: the Long DRX cycle and drx-StartOffset which defines the subframe where the Long and Short DRX Cycle starts; |
| ✓ SL drx-ShortCycle (optional): the Short DRX cycle; |
| ✓ SL drx-ShortCycleTimer (optional): the duration the UE shall follow the Short DRX cycle; SL drx-HARQ-RTT-Timer (per Sidelink process): the minimum duration before an assignment for HARQ retransmission is expected by the MAC entity. |

For example, if the receiving UE receives the second SL data and the third SL data, and their L1 IDs match as a result of checking, the inactivity timer may be restarted at the time point of receiving SCI related to each SL data. For example, being restarted may mean initializing the running timer value and restarting the inactivity timer value.

Afterwards, for example, as shown in FIG. 11, a receiving UE may continue to attempt to check the L2 ID of the third SL data during the interval in which the inactivity timer is running. For example, if at least one SL data, such as the third SL data, is present at the receiving UE for which the L2 ID has not been checked, the inactivity timer may not be stopped. For example, if L2 ID continues to be unchecked, the inactivity timer may be stopped at the time point of expiration.

Figure 12:
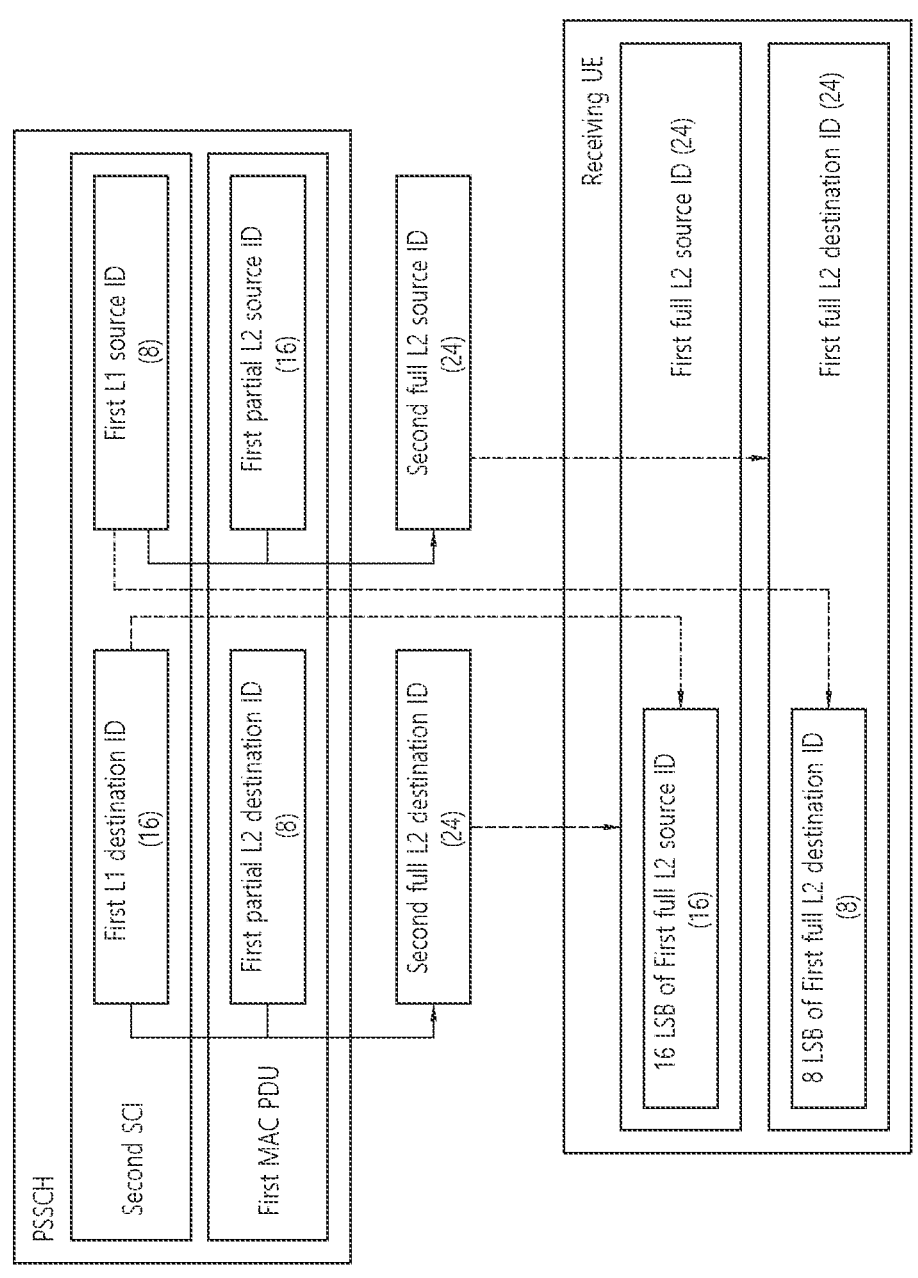
FIG. 12 shows a method for L1 ID matching and L2 ID matching in unicast, according to one embodiment of the present disclosure.

FIG. 12 shows a method for L1 ID matching and L2 ID matching in unicast, according to one embodiment of the present disclosure. The embodiment of FIG. 12 may be combined with various embodiments of the present disclosure.

Referring to FIG. 12, a PSSCH received by a receiving UE and the receiving UE's own L2 ID are shown.

For example, L1 ID matching in unicast may mean an operation wherein a first L1 destination ID included in second SCI of a PSSCH is compared with 16 LSB of a first full L2 source ID of a receiving UE, and a first L1 source ID included in the second SCI is compared with 8 LSB of a first full L2 destination ID of the receiving UE. According to an embodiment of the present disclosure, if the first L1 destination ID is the same as 16 LSB of the first full L2 source ID, and if the first L1 source ID is the same as 8 LSB of the first full L2 destination ID, the L1 matching may be determined to be successful, and an SL DRX inactivity timer may be started based on the success.

For example, L2 ID matching in unicast may mean an operation wherein a second full L2 destination ID obtained based on the first L1 destination ID and a first partial L2 destination ID included in a MAC subheader of the PSSCH is compared with a first full L2 source ID of the receiving UE, and a second full L2 source ID obtained based on the first L1 source ID and a first partial L2 source ID included in the MAC subheader is compared to a first full L2

The following SL DRX timers mentioned in this disclosure may be used for the following purposes.

SL DRX on-duration timer: Indicates the period of time during which a UE performing SL DRX operation should operate as the default active time to receive PSCCH/PSSCH from other UE.

SL DRX inactivity timer: may represent an interval that extends an SL DRX on-duration interval, which is an interval during which a UE performing SL DRX operation must operate as active time by default to receive PSCCH/PSSCH from other UE. That is, an SL DRX on-duration timer may be extended by the SL DRX inactivity timer interval. Furthermore, when a UE receives a PSCCH for a new TB (first SCI and/or second SCI) or a new packet (new PSSCH transmission) from other UE, the UE may extend the SL DRX on-duration timer by starting an SL DRX inactivity timer.

SL DRX HARQ RTT timer: may indicate an interval during which a UE performing SL DRX operation may operate in sleep mode until it receives a retransmission packet (or PSSCH assignment) from other UE. That is, if a UE starts the SL DRX HARQ RTT timer, the UE may determine that other UE will not transmit a sidelink retransmission packet to it until the SL DRX HARQ RTT timer expires and may operate in sleep mode during that timer. Or, the UE may not perform monitoring of an SL channel/signal which the counterpart UE transmits, until the expiration of an SL DRX HARQ RTT timer.

SL DRX retransmission timer: may indicate an interval of time during which a UE performing SL DRX operation is active time to receive retransmission packets (or PSSCH assignments) transmitted by other UE. For example, when an SL DRX HARQ RTT timer expires, an SL DRX retransmission timer may start. During this timer period, a UE may monitor a reception of retransmission sidelink packets (or PSSCH allocations) transmitted by other UE.

In addition, in the following description, the names of the timers (SL DRX On-Duration Timer, SL DRX Inactivity timer, SL HARQ RTT Timer, SL DRX Retransmission Timer, etc.) are exemplary, and timers that perform the same/similar functions based on what is described in each timer can be considered the same/similar timer regardless of the name.

The proposal in this disclosure is a solution that may also be applied and extended to address the problem of loss due to interruption in Uu bandwidth part (BWP) switching.

Furthermore, the proposal of the present disclosure is a solution that may also be applied and extended to address the problem of loss due to interruption caused by SL BWP switching, for example, when a UE supports SL multiple BWP.

The proposals in this disclosure may be extended to parameters (and timers) included in default/common SL DRX configurations or default/common SL DRX patterns or default/common SL DRX configurations, as well as parameters (and timers) included in UE pair specific SL DRX configurations or UE pair specific SL DRX patterns or UE pair specific SL DRX configurations.

Furthermore, for example, an on-duration term referred to in the present disclosure may be extended to an active time interval, and an off-duration term may be extended to a sleep time interval. For example, an active time may refer to a period of time when a UE is operating in a wake up state (RF module is on) to receive/transmit radio signals. For example, sleep time may refer to an interval during which a UE operates in a sleep mode state (RF module is off) to conserve power. For example, a sleep period does not imply that a transmitting UE is obligated to operate in sleep mode, i.e., the UE may be allowed to operate in active time for a short period of time to perform a sensing operation/transmission operation if necessary, even during a sleep period.

Further, for example, whether (some of) the proposed schemes/rules of this disclosure apply and/or the related parameters (e.g., thresholds) may be configured specifically (or differently or independently) depending on the resource pool, congestion level, service priority (and/or type), QoS requirements (e.g., latency, reliability) or PQI, traffic type (e.g., (aperiodic) generation), SL transport resource allocation mode (Mode 1, Mode 2), a Tx profile (e.g., a TX profile indicating that it is a service where an SL DRX operation is supported, a Tx profile indicating that it is a service where an SL DRX operation is not needed to be supported), etc.

For example, whether to apply the proposals of the present disclosure (and/or related parameter configuration value) may be configured specifically (and/or, independently and/or differently) for at least one of a resource pool (e.g., a resource pool where a PSFCH is configured, a resource pool where a PSFCH is not configured), service/packet type (and/or priority), QoS profile or QoS requirement (e.g., URLLC/EMBB traffic, reliability, latency), PQI, PFI, cast type (e.g., unicast, groupcast, broadcast). (resource pool) congestion level (e.g., CBR), SL HARQ feedback mode (e.g., NACK only feedback, ACK/NACK feedback), a HARQ feedback enabled MAC PDU (and/or a HARQ feedback disabled MAC PDU) transmission case, whether PUCCH based SL HARQ feedback reporting operation is configured, a case where pre-emption (and/or re-evaluation) (or, -based resource reselection) is (not) performed, (L2 or L1) (source and/or destination) ID, (L2 or L1)(a combination of a source layer ID and a destination layer ID) identifier, (L2 or L1) (a combination of a pair of a source layer ID and an destination layer ID, and a cast type) identifier, a direction of a pair of a source layer ID and a destination layer ID, PC5 RRC connection/link, a case where an SL DRX is (not) performed (or, supported), SL mode type (resource allocation mode 1, resource allocation mode 2), a case where (a)periodic resource reservation is performed, a Tx profile (e.g., a TX profile indicating that it is a service where an SL DRX operation is supported, a Tx profile indicating that it is a service where an SL DRX operation is not needed to be supported).

For example, the term active time as used in the present disclosure may refer to a predefined amount of time for a UE to receive sidelink signaling or sidelink data from another UE, or a period of time, or a specific timer (SL DRX retransmission timer, SL DRX inactivity timer, or a timer to ensure a receiving UE to operate as an active time in DRX operation) time, during which a UE is active.

Further, for example, whether the proposals and proposed rules in this disclosure apply (and/or the associated parameter configuration values) may also apply to mmWave SL operation.

According to one embodiment of the present disclosure, when a power-saving UE receives multiple SL data, the power-saving effect may be improved by reducing the number of situations in which an SL DRX inactivity timer remains unnecessarily active even when L2 ID matching is not successful.

Figure 13B:
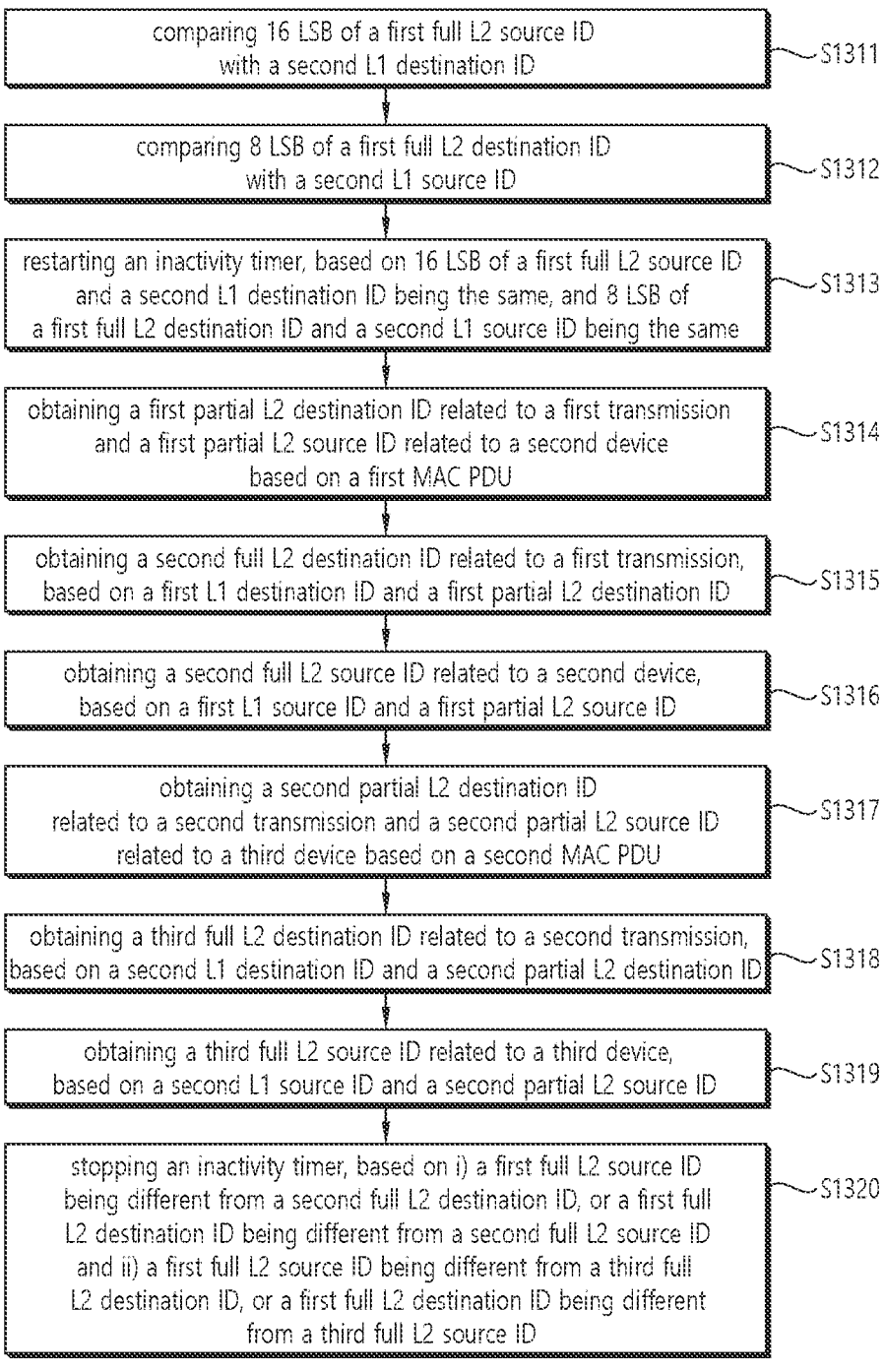

FIGS. 13A and 13B show a procedure for a first device to perform wireless communication, according to one embodiment of the present disclosure. The embodiments of FIGS. 13A and 13B may be combined with various embodiments of the present disclosure.

Referring to FIG. 13A, in step S1301, a first device may obtain a sidelink (SL) discontinuous reception (DRX) configuration. In step S1302, the first device may receive, from a second device, first sidelink control information (SCI) related to a first transmission, for scheduling of a first physical sidelink shared channel (PSSCH) through a first physical sidelink control channel (PSCCH), within an active time of the SL DRX configuration. In step S1303, the first device may receive, from the second device, a first medium access control (MAC) protocol data unit (PDU) related to the first transmission and second SCI related to the first transmission through the first PSSCH, within the active time. In step S1304, the first device may obtain a first layer (L) 1 destination identifier (ID) related to the first transmission and a first L1 source ID related to the second device, based on the second SCI. In step S1305, the first device may compare 16 least significant bits (LSB) of a first full L2 source ID of the first device with the first L1 destination ID. In step S1306, the first device may compare 8 LSB of a first full L2 destination ID of the first device with the first L1 source ID. In step S1307, the first device may start an inactivity timer of the SL DRX configuration, based on the 16 LSB of the first full L2 source ID and the first L1 destination ID being the same, and the 8 LSB of the first full L2 destination ID and the first L1 source ID being the same. In step S1308, the first device may receive, from a third device, third SCI related to a second transmission, for scheduling of a second PSSCH through a second PSCCH, within the active time. In step S1309, the first device may receive, from the third device, a second MAC PDU related to the second transmission and fourth SCI related to the second transmission through the second PSSCH, within the active time. In step S1310, the first device may obtain a second L1 destination ID related to the second transmission and a second L1 source ID related to the third device, based on the fourth SCI.

Referring to FIG. 13B, in step S1311, the first device may compare the 16 LSB of the first full L2 source ID with the second L1 destination ID. In step S1312, the first device may compare the 8 LSB of the first full L2 destination ID with the second L1 source ID. In step S1313, the first device may restart the inactivity timer, based on the 16 LSB of the first full L2 source ID and the second L1 destination ID being the same, and the 8 LSB of the first full L2 destination ID and the second L1 source ID being the same. In step S1314, the first device may obtain a first partial L2 destination ID related to the first transmission and a first partial L2 source ID related to the second device based on the first MAC PDU. In step S1315, the first device may obtain a second full L2 destination ID related to the first transmission, based on the first L1 destination ID and the first partial L2 destination ID. In step S1316, the first device may obtain a second full L2 source ID related to the second device, based on the first L1 source ID and the first partial L2 source ID. In step S1317, the first device may obtain a second partial L2 destination ID related to the second transmission and a second partial L2 source ID related to the third device based on the second MAC PDU. In step S1318, the first device may obtain a third full L2 destination ID related to the second transmission, based on the second L1 destination ID and the second partial L2 destination ID. In step S1319, the first device may obtain a third full L2 source ID related to the third device, based on the second L1 source ID and the second partial L2 source ID. In step S1320, the first device may stop the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

For example, the active time may be a time during which the inactivity timer is running.

For example, the second device may be the same as the third device.

For example, the first L1 destination ID may be 16 bits, the first L1 source ID may be 8 bits, the first full L2 source ID may be 24 bits, the first full L2 destination ID may be 24 bits, the second L1 destination ID may be 16 bits, the second L1 source ID may be 8 bits, the first partial L2 destination ID may be 8 bits, the first partial L2 source ID may be 16 bits, the second full L2 destination ID may be 24 bits, the second full L2 source ID may be 24 bits, the second partial L2 destination ID may be 8 bits, the second partial L2 source ID may be 16 bits, the third full L2 destination ID may be 24 bits, and the third full L2 source Id may be 24 bits.

For example, the inactivity timer may be not stopped, based on the first full L2 source ID being the same as the second full L2 destination ID, and the inactivity timer may be not stopped, based on the first full L2 source ID being the same as the second full L2 destination ID, and the first full L2 destination ID being the same as the second full L2 source ID.

For example, stopping the inactivity timer may be not allowed, based on the first full L2 source ID being the same as the second full L2 destination ID, and the first full L2 destination ID being the same as the second full L2 source ID.

For example, the inactivity timer may be not stopped, based on the first full L2 source ID being the same as the third full L2 destination ID, and the first full L2 destination ID being the same as the third full L2 source ID.

For example, stopping the inactivity timer may be not allowed, based on the first full L2 source ID being the same as the third full L2 destination ID, and the first full L2 destination ID being the same as the third full L2 source ID.

For example, the inactivity timer may be not stopped, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID, being not determined.

For example, stopping the inactivity timer may be not allowed, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID, being not determined.

For example, additionally, the first device may transition to a sleep mode, based on the inactivity timer being stopped. For example, monitoring for SL communication may be not performed, based on the sleep mode.

For example, the first partial L2 destination ID and the first partial L2 source ID may be obtained based on a MAC header of the first MAC PDU, and the second partial L2 destination ID and the second partial L2 source ID may be obtained based on a MAC header of the second MAC PDU.

For example, restarting the inactivity timer may include: starting the inactivity timer again by an inactivity timer value, after initializing the inactivity timer, based on the inactivity timer being running; and starting the inactivity timer by the inactivity timer value, based on the inactivity timer being not running.

The embodiments described above may be applied to various devices described below. For example, a processor 102 of a first device 100 may obtain a sidelink (SL) discontinuous reception (DRX) configuration. And, the processor 102 of the first device 100 may control a transceiver 106 to receive, from a second device 200, first sidelink control information (SCI) related to a first transmission, for scheduling of a first physical sidelink shared channel (PSSCH) through a first physical sidelink control channel (PSCCH), within an active time of the SL DRX configuration. And, the processor 102 of the first device 100 may control the transceiver 106 to receive, from the second device 200, a first medium access control (MAC) protocol data unit (PDU) related to the first transmission and second SCI related to the first transmission through the first PSSCH, within the active time. And, the processor 102 of the first device 100 may obtain a first layer (L) 1 destination identifier (ID) related to the first transmission and a first L1 source ID related to the second device 200, based on the second SCI. And, the processor 102 of the first device 100 may compare 16 least significant bits (LSB) of a first full L2 source ID of the first device 100 with the first L1 destination ID. And, the processor 102 of the first device 100 may compare 8 LSB of a first full L2 destination ID of the first device 100 with the first L1 source ID. And, the processor 102 of the first device 100 may start an inactivity timer of the SL DRX configuration, based on the 16 LSB of the first full L2 source ID and the first L1 destination ID being the same, and the 8 LSB of the first full L2 destination ID and the first L1 source ID being the same. And, the processor 102 of the first device 100 may control the transceiver 106 to receive, from a third device, third SCI related to a second transmission, for scheduling of a second PSSCH through a second PSCCH, within the active time. And, the processor 102 of the first device 100 may control the transceiver 106 to receive, from the third device, a second MAC PDU related to the second transmission and fourth SCI related to the second transmission through the second PSSCH, within the active time. And, the processor 102 of the first device 100 may obtain a second L1 destination ID related to the second transmission and a second L1 source ID related to the third device, based on the fourth SCI. And, the processor 102 of the first device 100 may compare the 16 LSB of the first full L2 source ID with the second L1 destination ID. And, the processor 102 of the first device 100 may compare the 8 LSB of the first full L2 destination ID with the second L1 source ID. And, the processor 102 of the first device 100 may restart the inactivity timer, based on the 16 LSB of the first full L2 source ID and the second L1 destination ID being the same, and the 8 LSB of the first full L2 destination ID and the second L1 source ID being the same. And, the processor 102 of the first device 100 may obtain a first partial L2 destination ID related to the first transmission and a first partial L2 source ID related to the second device 200 based on the first MAC PDU. And, the processor 102 of the first device 100 may obtain a second full L2 destination ID related to the first transmission, based on the first L1 destination ID and the first partial L2 destination ID. And, the processor 102 of the first device 100 may obtain a second full L2 source ID related to the second device 200, based on the first L1 source ID and the first partial L2 source ID. And, the processor 102 of the first device 100 may obtain a second partial L2 destination ID related to the second transmission and a second partial L2 source ID related to the third device based on the second MAC PDU. And, the processor 102 of the first device 100 may obtain a third full L2 destination ID related to the second transmission, based on the second L1 destination ID and the second partial L2 destination ID. And, the processor 102 of the first device 100 may obtain a third full L2 source ID related to the third device, based on the second L1 source ID and the second partial L2 source ID. And, the processor 102 of the first device 100 may stop the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

According to an embodiment of the present disclosure, a first device for performing wireless communication may be proposed. For example, the first device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration; receive, from a second device, first sidelink control information (SCI) related to a first transmission, for scheduling of a first physical sidelink shared channel (PSSCH) through a first physical sidelink control channel (PSCCH), within an active time of the SL DRX configuration; receive, from the second device, a first medium access control (MAC) protocol data unit (PDU) related to the first transmission and second SCI related to the first transmission through the first PSSCH, within the active time; obtain a first layer (L) 1 destination identifier (ID) related to the first transmission and a first L1 source ID related to the second device, based on the second SCI; compare 16 least significant bits (LSB) of a first full L2 source ID of the first device with the first L1 destination ID; compare 8 LSB of a first full L2 destination ID of the first device with the first L1 source ID; start an inactivity timer of the SL DRX configuration, based on the 16 LSB of the first full L2 source ID and the first L1 destination ID being the same, and the 8 LSB of the first full L2 destination ID and the first L1 source ID being the same; receive, from a third device, third SCI related to a second transmission, for scheduling of a second PSSCH through a second PSCCH, within the active time; receive, from the third device, a second MAC PDU related to the second transmission and fourth SCI related to the second transmission through the second PSSCH, within the active time; obtain a second L1 destination ID related to the second transmission and a second L1 source ID related to the third device, based on the fourth SCI; obtain a second L1 destination ID related to the second transmission and a second L1 source ID related to the third device, based on the fourth SCI; compare the 16 LSB of the first full L2 source ID with the second L1 destination ID; compare the 8 LSB of the first full L2 destination ID with the second L1 source ID; restart the inactivity timer, based on the 16 LSB of the first full L2 source ID and the second L1 destination ID being the same, and the 8 LSB of the first full L2 destination ID and the second L1 source ID being the same; obtain a first partial L2 destination ID related to the first transmission and a first partial L2 source ID related to the second device based on the first MAC PDU; obtain a second full L2 destination ID related to the first transmission, based on the first L1 destination ID and the first partial L2 destination ID; obtain a second full L2 source ID related to the second device, based on the first L1 source ID and the first partial L2 source ID; obtain a second partial L2 destination ID related to the second transmission and a second partial L2 source ID related to the third device based on the second MAC PDU; obtain a third full L2 destination ID related to the second transmission, based on the second L1 destination ID and the second partial L2 destination ID; obtain a third full L2 source ID related to the third device, based on the second L1 source ID and the second partial L2 source ID; and stop the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

For example, the active time may be a time during which the inactivity timer is running.

For example, the second device may be the same as the third device.

For example, the first L1 destination ID may be 16 bits, the first L1 source ID may be 8 bits, the first full L2 source ID may be 24 bits, the first full L2 destination ID may be 24 bits, the second L1 destination ID may be 16 bits, the second L1 source ID may be 8 bits, the first partial L2 destination ID may be 8 bits, the first partial L2 source ID may be 16 bits, the second full L2 destination ID may be 24 bits, the second full L2 source ID may be 24 bits, the second partial L2 destination ID may be 8 bits, the second partial L2 source ID may be 16 bits, the third full L2 destination ID may be 24 bits, and the third full L2 source Id may be 24 bits.

For example, the inactivity timer may be not stopped, based on the first full L2 source ID being the same as the second full L2 destination ID, and the inactivity timer may be not stopped, based on the first full L2 source ID being the same as the second full L2 destination ID, and the first full L2 destination ID being the same as the second full L2 source ID.

For example, stopping the inactivity timer may be not allowed, based on the first full L2 source ID being the same as the second full L2 destination ID, and the first full L2 destination ID being the same as the second full L2 source ID.

For example, the inactivity timer may be not stopped, based on the first full L2 source ID being the same as the third full L2 destination ID, and the first full L2 destination ID being the same as the third full L2 source ID.

For example, stopping the inactivity timer may be not allowed, based on the first full L2 source ID being the same as the third full L2 destination ID, and the first full L2 destination ID being the same as the third full L2 source ID.

For example, the inactivity timer may be not stopped, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID, being not determined.

For example, stopping the inactivity timer may be not allowed, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID, being not determined.

For example, additionally, the first device may transition to a sleep mode, based on the inactivity timer being stopped. For example, monitoring for SL communication may be not performed, based on the sleep mode.

For example, the first partial L2 destination ID and the first partial L2 source ID may be obtained based on a MAC header of the first MAC PDU, and the second partial L2 destination ID and the second partial L2 source ID may be obtained based on a MAC header of the second MAC PDU.

For example, an operation of restarting the inactivity timer may include: starting the inactivity timer again by an inactivity timer value, after initializing the inactivity timer, based on the inactivity timer being running; and starting the inactivity timer by the inactivity timer value, based on the inactivity timer being not running.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain a sidelink (SL) discontinuous reception (DRX) configuration: receive, from a second UE, first sidelink control information (SCI) related to a first transmission, for scheduling of a first physical sidelink shared channel (PSSCH) through a first physical sidelink control channel (PSCCH), within an active time of the SL DRX configuration: receive, from the second UE, a first medium access control (MAC) protocol data unit (PDU) related to the first transmission and second SCI related to the first transmission through the first PSSCH, within the active time; obtain a first layer (L) 1 destination identifier (ID) related to the first transmission and a first L1 source ID related to the second UE, based on the second SCI; compare 16 least significant bits (LSB) of a first full L2 source ID of the first UE with the first L1 destination ID; compare 8 LSB of a first full L2 destination ID of the first UE with the first L1 source ID; start an inactivity timer of the SL DRX configuration, based on the 16 LSB of the first full L2 source ID and the first L1 destination ID being the same, and the 8 LSB of the first full L2 destination ID and the first L1 source ID being the same; receive, from a third UE, third SCI related to a second transmission, for scheduling of a second PSSCH through a second PSCCH, within the active time; receive, from the third UE, a second MAC PDU related to the second transmission and fourth SCI related to the second transmission through the second PSSCH, within the active time; obtain a second L1 destination ID related to the second transmission and a second L1 source ID related to the third UE, based on the fourth SCI; obtain a second L1 destination ID related to the second transmission and a second L1 source ID related to the third UE, based on the fourth SCI; compare the 16 LSB of the first full L2 source ID with the second L1 destination ID; compare the 8 LSB of the first full L2 destination ID with the second L1 source ID; restart the inactivity timer, based on the 16 LSB of the first full L2 source ID and the second L1 destination ID being the same, and the 8 LSB of the first full L2 destination ID and the second L1 source ID being the same; obtain a first partial L2 destination ID related to the first transmission and a first partial L2 source ID related to the second UE based on the first MAC PDU; obtain a second full L2 destination ID related to the first transmission, based on the first L1 destination ID and the first partial L2 destination ID; obtain a second full L2 source ID related to the second UE, based on the first L1 source ID and the first partial L2 source ID; obtain a second partial L2 destination ID related to the second transmission and a second partial L2 source ID related to the third UE based on the second MAC PDU; obtain a third full L2 destination ID related to the second transmission, based on the second L1 destination ID and the second partial L2 destination ID; obtain a third full L2 source ID related to the third UE, based on the second L1 source ID and the second partial L2 source ID; and stop the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

According to an embodiment of the present disclosure, a non-transitory computer-readable storage medium storing instructions may be proposed. For example, the instructions, when executed, may cause a first device to: obtain a sidelink (SL) discontinuous reception (DRX) configuration; receive, from a second device, first sidelink control information (SCI) related to a first transmission, for scheduling of a first physical sidelink shared channel (PSSCH) through a first physical sidelink control channel (PSCCH), within an active time of the SL DRX configuration; receive, from the second device, a first medium access control (MAC) protocol data unit (PDU) related to the first transmission and second SCI related to the first transmission through the first PSSCH, within the active time; obtain a first layer (L) 1 destination identifier (ID) related to the first transmission and a first L1 source ID related to the second device, based on the second SCI; compare 16 least significant bits (LSB) of a first full L2 source ID of the first device with the first L1 destination ID; compare 8 LSB of a first full L2 destination ID of the first device with the first L1 source ID; start an inactivity timer of the SL DRX configuration, based on the 16 LSB of the first full L2 source ID and the first L1 destination ID being the same, and the 8 LSB of the first full L2 destination ID and the first L1 source ID being the same; receive, from a third device, third SCI related to a second transmission, for scheduling of a second PSSCH through a second PSCCH, within the active time; receive, from the third device, a second MAC PDU related to the second transmission and fourth SCI related to the second transmission through the second PSSCH, within the active time; obtain a second L1 destination ID related to the second transmission and a second L1 source ID related to the third device, based on the fourth SCI; obtain a second L1 destination ID related to the second transmission and a second L1 source ID related to the third device, based on the fourth SCI; compare the 16 LSB of the first full L2 source ID with the second L1 destination ID; compare the 8 LSB of the first full L2 destination ID with the second L1 source ID; restart the inactivity timer, based on the 16 LSB of the first full L2 source ID and the second L1 destination ID being the same, and the 8 LSB of the first full L2 destination ID and the second L1 source ID being the same; obtain a first partial L2 destination ID related to the first transmission and a first partial L2 source ID related to the second device based on the first MAC PDU; obtain a second full L2 destination ID related to the first transmission, based on the first L1 destination ID and the first partial L2 destination ID; obtain a second full L2 source ID related to the second device, based on the first L1 source ID and the first partial L2 source ID; obtain a second partial L2 destination ID related to the second transmission and a second partial L2 source ID related to the third device based on the second MAC PDU; obtain a third full L2 destination ID related to the second transmission, based on the second L1 destination ID and the second partial L2 destination ID; obtain a third full L2 source ID related to the third device, based on the second L1 source ID and the second partial L2 source ID; and stop the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

Figure 14:
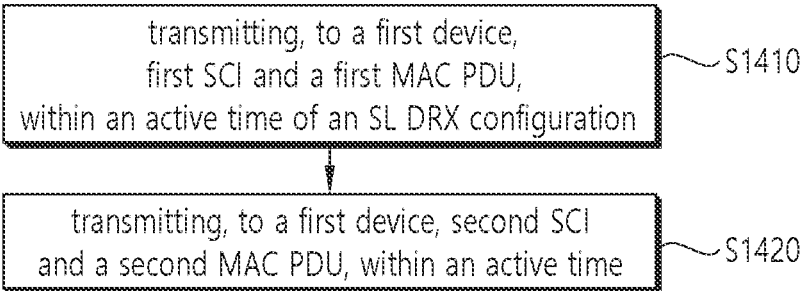
FIG. 14 shows a procedure for a second device to perform wireless communication, according to one embodiment of the present disclosure.

FIG. 14 shows a procedure for a second device to perform wireless communication, according to one embodiment of the present disclosure. The embodiment of FIG. 14 may be combined with various embodiments of the present disclosure.

Referring to FIG. 14, in step S1410, a second device may transmit, to a first device, first SCI and a first MAC PDU, within an active time of an SL DRX configuration. In step S1420, the second device may transmit, to the first device, second SCI and a second MAC PDU, within the active time. For example, the active time may be a time during which an inactivity timer of the SL DRX configuration may be running, the inactivity timer may be started based on 16 LSB of a first full L2 source ID of the first device being the same as a first L1 destination ID included in the first SCI, and 8 LSB of a first full L2 destination ID of the first device being the same as a first L1 source ID included in the first SCI, the inactivity timer may be restarted based on the 16 LSB of the first full L2 source ID being the same as a second L1 destination ID included in the second SCI, and the 8 LSB of the first full L2 destination ID being the same as a second L1 source ID included in the second SCI, the inactivity timer may be not stopped, based on i) the first full L2 source ID being different from a second full L2 destination ID, or the first full L2 destination ID being different from a second full L2 source ID and ii) the first full L2 source ID being different from a third full L2 destination ID, or the first full L2 destination ID being different from a third full L2 source ID, being not determined, the second full L2 destination ID may be obtained based on the first L1 destination ID and a first partial L2 destination ID included in the first MAC PDU, the second full L2 source ID may be obtained based on the first L1 source ID and a first partial L2 source ID included in the first MAC PDU, the third full L2 destination ID may be obtained based on the second L1 destination ID and a second partial L2 destination ID included in the second MAC PDU, and the third full L2 source ID may be obtained based on the second L1 source ID and a second partial L2 source ID included in the second MAC PDU.

For example, the inactivity timer may be not stopped, based on the first full L2 source ID being the same as the second full L2 destination ID, and the first full L2 destination ID being the same as the second full L2 source ID.

The embodiments described above may be applied to various devices described below. For example, a processor 202 of a second device 200 may control a transceiver 206 to transmit, to a first device 100, first SCI and a first MAC PDU, within an active time of an SL DRX configuration. And, the processor 202 of the second device 200 may control the transceiver 206 to transmit, to the first device 100, second SCI and a second MAC PDU, within the active time. For example, the active time may be a time during which an inactivity timer of the SL DRX configuration may be running, the inactivity timer may be started based on 16 LSB of a first full L2 source ID of the first device 100 being the same as a first L1 destination ID included in the first SCI, and 8 LSB of a first full L2 destination ID of the first device 100 being the same as a first L1 source ID included in the first SCI, the inactivity timer may be restarted based on the 16 LSB of the first full L2 source ID being the same as a second L1 destination ID included in the second SCI, and the 8 LSB of the first full L2 destination ID being the same as a second L1 source ID included in the second SCI, the inactivity timer may be not stopped, based on i) the first full L2 source ID being different from a second full L2 destination ID, or the first full L2 destination ID being different from a second full L2 source ID and ii) the first full L2 source ID being different from a third full L2 destination ID, or the first full L2 destination ID being different from a third full L2 source ID, being not determined, the second full L2 destination ID may be obtained based on the first L1 destination ID and a first partial L2 destination ID included in the first MAC PDU, the second full L2 source ID may be obtained based on the first L1 source ID and a first partial L2 source ID included in the first MAC PDU, the third full L2 destination ID may be obtained based on the second L1 destination ID and a second partial L2 destination ID included in the second MAC PDU, and the third full L2 source ID may be obtained based on the second L1 source ID and a second partial L2 source ID included in the second MAC PDU.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors execute the instructions to: transmit, to a first device, first SCI and a first MAC PDU, within an active time of an SL DRX configuration; and transmit, to the first device, second SCI and a second MAC PDU, within the active time, wherein the active time may be a time during which an inactivity timer of the SL DRX configuration is running, wherein the inactivity timer may be started based on 16 LSB of a first full L2 source ID of the first device being the same as a first L1 destination ID included in the first SCI, and 8 LSB of a first full L2 destination ID of the first device being the same as a first L1 source ID included in the first SCI, wherein the inactivity timer may be restarted based on the 16 LSB of the first full L2 source ID being the same as a second L1 destination ID included in the second SCI, and the 8 LSB of the first full L2 destination ID being the same as a second L1 source ID included in the second SCI, wherein the inactivity timer may be not stopped, based on i) the first full L2 source ID being different from a second full L2 destination ID, or the first full L2 destination ID being different from a second full L2 source ID and ii) the first full L2 source ID being different from a third full L2 destination ID, or the first full L2 destination ID being different from a third full L2 source ID, being not determined, wherein the second full L2 destination ID may be obtained based on the first L1 destination ID and a first partial L2 destination ID included in the first MAC PDU, wherein the second full L2 source ID may be obtained based on the first L1 source ID and a first partial L2 source ID included in the first MAC PDU, wherein the third full L2 destination ID may be obtained based on the second L1 destination ID and a second partial L2 destination ID included in the second MAC PDU, and wherein the third full L2 source ID may be obtained based on the second L1 source ID and a second partial L2 source ID included in the second MAC PDU.

For example, the inactivity timer may be not stopped, based on the first full L2 source ID being the same as the second full L2 destination ID, and the first full L2 destination ID being the same as the second full L2 source ID.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
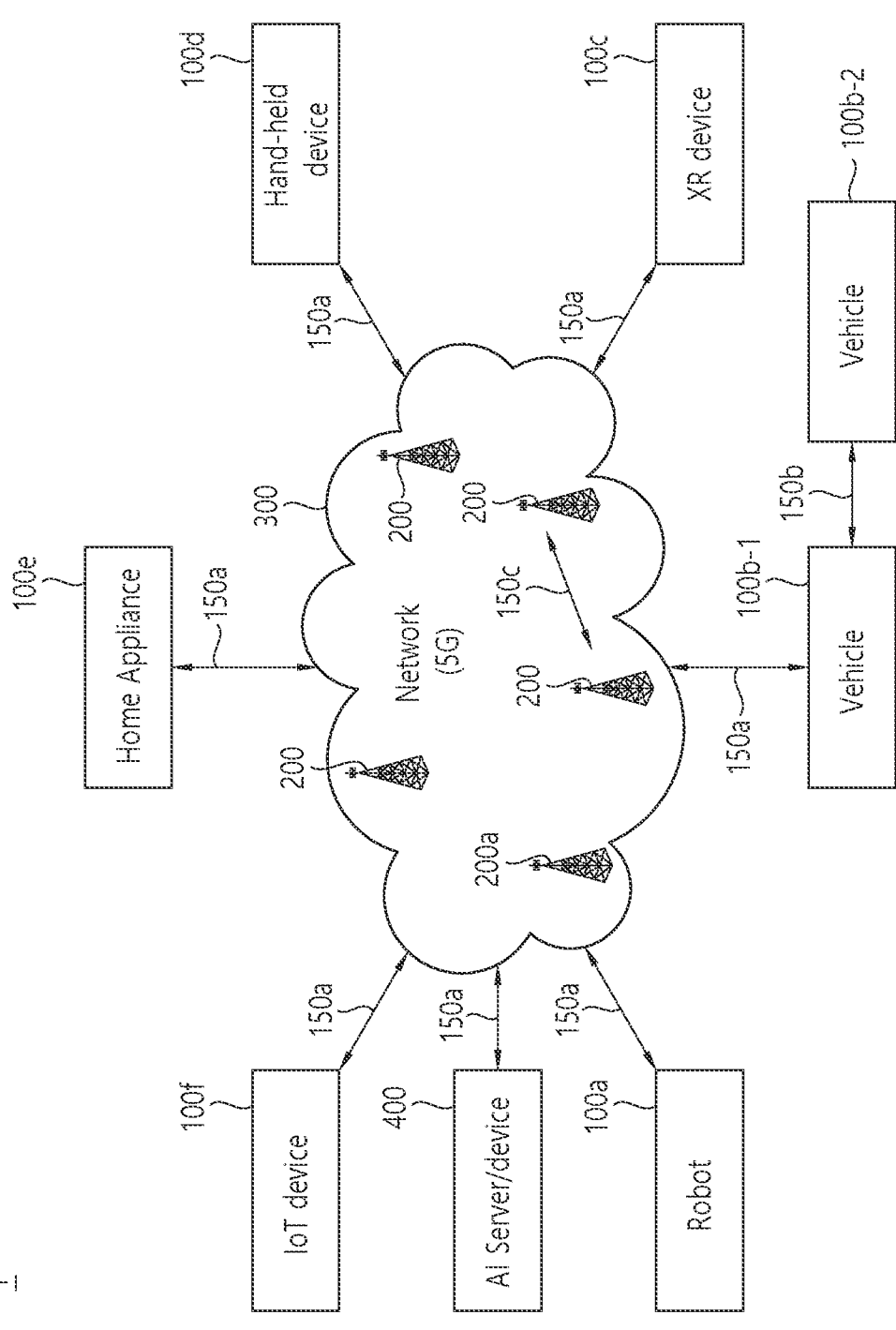
FIG. 15 shows a communication system 1, based on an embodiment of the present disclosure.

FIG. 15 shows a communication system 1, based on an embodiment of the present disclosure. The embodiment of FIG. 15 may be combined with various embodiments of the present disclosure.

Referring to FIG. 15, a communication system 1 to which various embodiments of the present disclosure are applied includes wireless devices. Base Stations (BSs), and a network. Herein, the wireless devices represent devices performing communication using Radio Access Technology (RAT)(e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, the wireless communication technologies implemented in the wireless devices 100a-100f of the present disclosure may include LTE, NR, and 6G, as well as Narrowband Internet of Things for low power communication. In this case, for example, NB-IoT technology may be an example of Low Power Wide Area Network (LPWAN) technology, and may be implemented in specifications such as LTE Cat NB1 and/or LTE Cat NB2, and is not limited to the above names. Additionally or alternatively, the wireless communication technology implemented in the wireless devices 100a-100f of this specification may perform communication based on LTE-M technology. In one example, LTE-M technology may be an example of LPWAN technology and may be referred to by various names, such as enhanced Machine Type Communication (eMTC). For example, LTE-M technology may be implemented as at least one of various specifications, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above names. Additionally or alternatively, the wireless communication technology implemented in the wireless devices 100a-100f of this disclosure may include at least one of ZigBee, Bluetooth, and Low Power Wide Area Network (LPWAN), with consideration for low power communication, and is not limited to the above names. For example, ZigBee technology can create personal area networks (PANs) for small, low-power digital communications based on various specifications, such as IEEE 802.15.4, and may be referred to by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE)network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
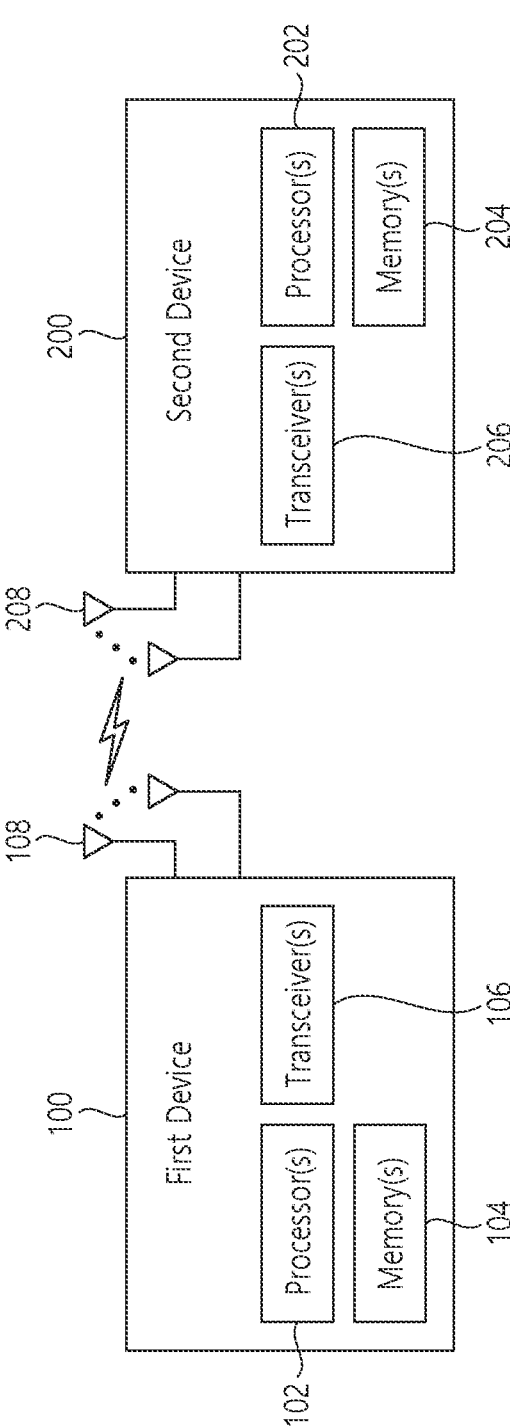
FIG. 16 shows wireless devices, based on an embodiment of the present disclosure.

FIG. 16 shows wireless devices, based on an embodiment of the present disclosure. The embodiment of FIG. 16 may be combined with various embodiments of the present disclosure.

Referring to FIG. 16, a first wireless device 100 and a second wireless device 200 may transmit radio signals through a variety of RATs (e.g., LTE and NR). Herein, (the first wireless device 100 and the second wireless device 200) may correspond to (the wireless device 100x and the BS 200) and/or (the wireless device 100x and the wireless device 10x) of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs. SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs). Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
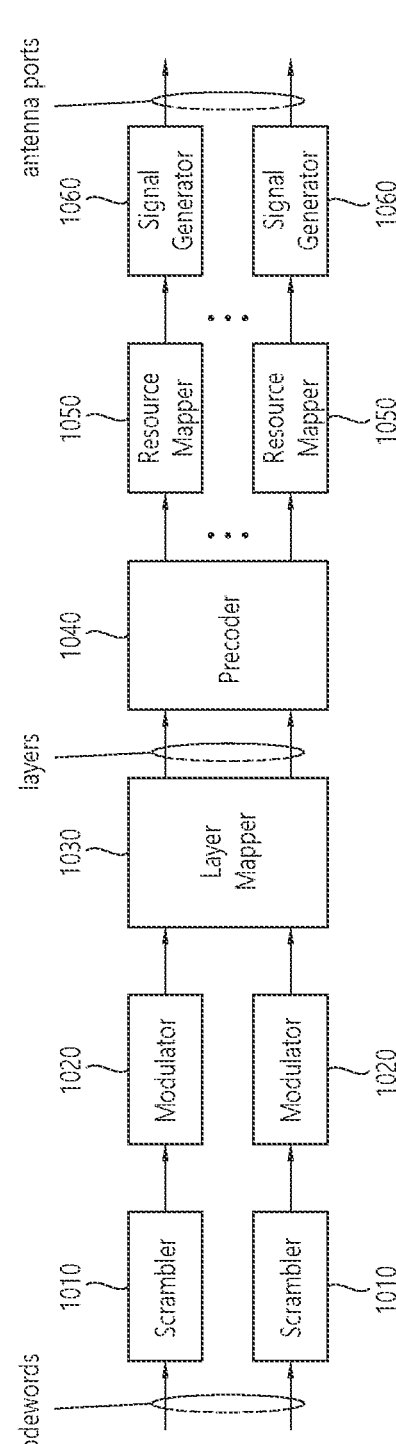
FIG. 17 shows a signal process circuit for a transmission signal, based on an embodiment of the present disclosure.

FIG. 17 shows a signal process circuit for a transmission signal, based on an embodiment of the present disclosure. The embodiment of FIG. 17 may be combined with various embodiments of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein. N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 18 shows another example of a wireless device, based on an embodiment of the present disclosure. The wireless device may be implemented in various forms according to a use-case/service (refer to FIG. 15). The embodiment of FIG. 18 may be combined with various embodiments of the present disclosure.

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the trans-ceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously config-ured according to types of wireless devices. For example, the additional components 140 may include at least one of a power unit/battery, input/output (I/O) unit, a driving unit, and a computing unit. The wireless device may be imple-mented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, compo-nents, units/portions, and/or modules in the wireless devices 100 and 200 may be connected to each other through a wired interface or at least a part thereof may be wirelessly con-nected through the communication unit 110. For example, in each of the wireless devices 100 and 200, the control unit 120 and the communication unit 110 may be connected by wire and the control unit 120 and first units (e.g., 130 and 140) may be wirelessly connected through the communica-tion unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

FIG. 19 shows a hand-held device, based on an embodi-ment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 19 may be combined with various embodiments of the present disclosure.

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The inter-face unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a micro-phone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
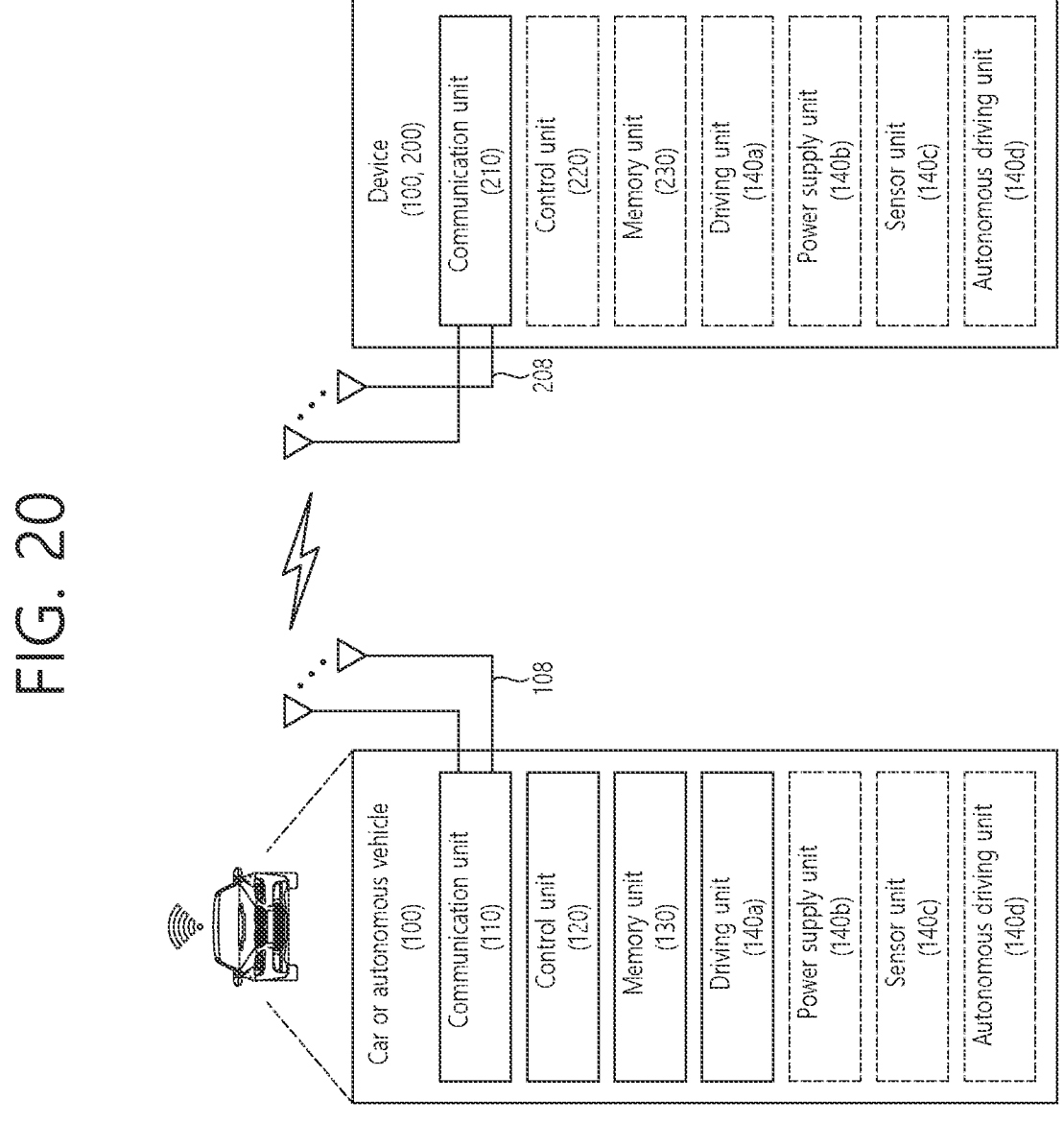
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 20 may be combined with various embodiments of the present disclosure.

Referring to FIG. 20, a vehicle or autonomous vehicle 100 may include an antenna unit 108, a communication unit 110, a control unit 120, a driving unit 140a, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:

obtaining a sidelink (SL) discontinuous reception (DRX) configuration;

receiving, from a second device, first sidelink control information (SCI) related to a first transmission, for scheduling of a first physical sidelink shared channel (PSSCH) through a first physical sidelink control channel (PSCCH), within an active time of the SL DRX configuration;

receiving, from the second device, a first medium access control (MAC) protocol data unit (PDU) related to the first transmission and second SCI related to the first transmission through the first PSSCH, within the active time;

obtaining a first layer (L) 1 destination identifier (ID) related to the first transmission and a first L1 source ID related to the second device, based on the second SCI;

comparing 16 least significant bits (LSB) of a first full L2 source ID of the first device with the first L1 destination ID;

comparing 8 LSB of a first full L2 destination ID of the first device with the first L1 source ID;

starting an inactivity timer of the SL DRX configuration, based on the 16 LSB of the first full L2 source ID and the first L1 destination ID being the same, and the 8 LSB of the first full L2 destination ID and the first L1 source ID being the same;

receiving, from a third device, third SCI related to a second transmission, for scheduling of a second PSSCH through a second PSCCH, within the active time;

receiving, from the third device, a second MAC PDU related to the second transmission and fourth SCI related to the second transmission through the second PSSCH, within the active time;

obtaining a second L1 destination ID related to the second transmission and a second L1 source ID related to the third device, based on the fourth SCI;

comparing the 16 LSB of the first full L2 source ID with the second L1 destination ID;

comparing the 8 LSB of the first full L2 destination ID with the second L1 source ID;

restarting the inactivity timer, based on the 16 LSB of the first full L2 source ID and the second L1 destination ID being the same, and the 8 LSB of the first full L2 destination ID and the second L1 source ID being the same;

obtaining a first partial L2 destination ID related to the first transmission and a first partial L2 source ID related to the second device based on the first MAC PDU;

obtaining a second full L2 destination ID related to the first transmission, based on the first L1 destination ID and the first partial L2 destination ID;

obtaining a second full L2 source ID related to the second device, based on the first L1 source ID and the first partial L2 source ID;

obtaining a second partial L2 destination ID related to the second transmission and a second partial L2 source ID related to the third device based on the second MAC PDU;

obtaining a third full L2 destination ID related to the second transmission, based on the second L1 destination ID and the second partial L2 destination ID;

obtaining a third full L2 source ID related to the third device, based on the second L1 source ID and the second partial L2 source ID; and stopping the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

2. The method of claim 1, wherein the active time is a time during which the inactivity timer is running.

3. The method of claim 1, wherein the second device is the same as the third device.

4. The method of claim 1, wherein the first L1 destination ID is 16 bits, wherein the first L1 source ID is 8 bits, wherein the first full L2 source ID is 24 bits, wherein the first full L2 destination ID is 24 bits, wherein the second L1 destination ID is 16 bits, wherein the second L1 source ID is 8 bits, wherein the first partial L2 destination ID is 8 bits, wherein the first partial L2 source ID is 16 bits, wherein the second full L2 destination ID is 24 bits, wherein the second full L2 source ID is 24 bits, wherein the second partial L2 destination ID is 8 bits, wherein the second partial L2 source ID is 16 bits, wherein the third full L2 destination ID is 24 bits, and wherein the third full L2 source Id is 24 bits.

5. The method of claim 1, wherein the inactivity timer is not stopped, based on the first full L2 source ID being the same as the second full L2 destination ID, and wherein the inactivity timer is not stopped, based on the first full L2 source ID being the same as the second full L2 destination ID, and the first full L2 destination ID being the same as the second full L2 source ID.

6. The method of claim 1, wherein stopping the inactivity timer is not allowed, based on the first full L2 source ID being the same as the second full L2 destination ID, and the first full L2 destination ID being the same as the second full L2 source ID.

7. The method of claim 1, wherein the inactivity timer is not stopped, based on the first full L2 source ID being the same as the third full L2 destination ID, and the first full L2 destination ID being the same as the third full L2 source ID.

8. The method of claim 1, wherein stopping the inactivity timer is not allowed, based on the first full L2 source ID being the same as the third full L2 destination ID, and the first full L2 destination ID being the same as the third full L2 source ID.

9. The method of claim 1, wherein the inactivity timer is not stopped, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID, being not determined.

10. The method of claim 1, wherein stopping the inactivity timer is not allowed, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID, being not determined.

11. The method of claim 1, further comprising:

transitioning to a sleep mode, based on the inactivity timer being stopped, wherein monitoring for SL communication is not performed, based on the sleep mode.

12. The method of claim 1, wherein the first partial L2 destination ID and the first partial L2 source ID are obtained based on a MAC header of the first MAC PDU, and wherein the second partial L2 destination ID and the second partial L2 source ID are obtained based on a MAC header of the second MAC PDU.

13. The method of claim 1, wherein restarting the inactivity timer includes:

starting the inactivity timer again by an inactivity timer value, after initializing the inactivity timer, based on the inactivity timer being running; and starting the inactivity timer by the inactivity timer value, based on the inactivity timer being not running.

14. A first device for performing wireless communication, the first device comprising:

one or more memories storing instructions;

one or more transceivers; and one or more processors connected to the one or more memories and the one or more transceivers, wherein the one or more processors execute the instructions to:

obtain a sidelink (SL) discontinuous reception (DRX) configuration;

receive, from a second device, first sidelink control information (SCI) related to a first transmission, for scheduling of a first physical sidelink shared channel (PSSCH) through a first physical sidelink control channel (PSCCH), within an active time of the SL DRX configuration;

receive, from the second device, a first medium access control (MAC) protocol data unit (PDU) related to the first transmission and second SCI related to the first transmission through the first PSSCH, within the active time;

obtain a first layer (L) 1 destination identifier (ID) related to the first transmission and a first L1 source ID related to the second device, based on the second SCI;

compare 16 least significant bits (LSB) of a first full L2 source ID of the first device with the first L1 destination ID;

compare 8 LSB of a first full L2 destination ID of the first device with the first L1 source ID;

start an inactivity timer of the SL DRX configuration, based on the 16 LSB of the first full L2 source ID and the first L1 destination ID being the same, and the 8 LSB of the first full L2 destination ID and the first L1 source ID being the same;

receive, from a third device, third SCI related to a second transmission, for scheduling of a second PSSCH through a second PSCCH, within the active time;

receive, from the third device, a second MAC PDU related to the second transmission and fourth SCI related to the second transmission through the second PSSCH, within the active time;

obtain a second L1 destination ID related to the second transmission and a second L1 source ID related to the third device, based on the fourth SCI;

compare the 16 LSB of the first full L2 source ID with the second L1 destination ID;

compare the 8 LSB of the first full L2 destination ID with the second L1 source ID;

restart the inactivity timer, based on the 16 LSB of the first full L2 source ID and the second L1 destination ID being the same, and the 8 LSB of the first full L2 destination ID and the second L1 source ID being the same;

obtain a first partial L2 destination ID related to the first transmission and a first partial L2 source ID related to the second device based on the first MAC PDU;

obtain a second full L2 destination ID related to the first transmission, based on the first L1 destination ID and the first partial L2 destination ID;

obtain a second full L2 source ID related to the second device, based on the first L1 source ID and the first partial L2 source ID;

obtain a second partial L2 destination ID related to the second transmission and a second partial L2 source ID related to the third device based on the second MAC PDU;

obtain a third full L2 destination ID related to the second transmission, based on the second L1 destination ID and the second partial L2 destination ID;

obtain a third full L2 source ID related to the third device, based on the second L1 source ID and the second partial L2 source ID; and stop the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

15. A device adapted to control a first user equipment (UE), the device comprising:

one or more processors; and one or more memories operably connectable to the one or more processors and storing instructions, wherein the one or more processors execute the instructions to:

obtain a sidelink (SL) discontinuous reception (DRX) configuration;

receive, from a second UE, first sidelink control information (SCI) related to a first transmission, for scheduling of a first physical sidelink shared channel (PSSCH) through a first physical sidelink control channel (PSCCH), within an active time of the SL DRX configuration;

receive, from the second UE, a first medium access control (MAC) protocol data unit (PDU) related to the first transmission and second SCI related to the first transmission through the first PSSCH, within the active time;

obtain a first layer (L) 1 destination identifier (ID) related to the first transmission and a first L1 source ID related to the second UE, based on the second SCI;

compare 16 least significant bits (LSB) of a first full L2 source ID of the first UE with the first L1 destination ID;

compare 8 LSB of a first full L2 destination ID of the first UE with the first L1 source ID;

start an inactivity timer of the SL DRX configuration, based on the 16 LSB of the first full L2 source ID and the first L1 destination ID being the same, and the 8 LSB of the first full L2 destination ID and the first L1 source ID being the same;

receive, from a third UE, third SCI related to a second transmission, for scheduling of a second PSSCH through a second PSCCH, within the active time;

receive, from the third UE, a second MAC PDU related to the second transmission and fourth SCI related to the second transmission through the second PSSCH, within the active time;

obtain a second L1 destination ID related to the second transmission and a second L1 source ID related to the third UE, based on the fourth SCI;

compare the 16 LSB of the first full L2 source ID with the second L1 destination ID;

compare the 8 LSB of the first full L2 destination ID with the second L1 source ID;

restart the inactivity timer, based on the 16 LSB of the first full L2 source ID and the second L1 destination ID being the same, and the 8 LSB of the first full L2 destination ID and the second L1 source ID being the same;

obtain a first partial L2 destination ID related to the first transmission and a first partial L2 source ID related to the second UE based on the first MAC PDU;

obtain a second full L2 destination ID related to the first transmission, based on the first L1 destination ID and the first partial L2 destination ID;

obtain a second full L2 source ID related to the second UE, based on the first L1 source ID and the first partial L2 source ID;

obtain a second partial L2 destination ID related to the second transmission and a second partial L2 source ID related to the third UE based on the second MAC PDU;

obtain a third full L2 destination ID related to the second transmission, based on the second L1 destination ID and the second partial L2 destination ID;

obtain a third full L2 source ID related to the third UE, based on the second L1 source ID and the second partial L2 source ID; and stop the inactivity timer, based on i) the first full L2 source ID being different from the second full L2 destination ID, or the first full L2 destination ID being different from the second full L2 source ID and ii) the first full L2 source ID being different from the third full L2 destination ID, or the first full L2 destination ID being different from the third full L2 source ID.

* * * * *